US008595203B2

(12) United States Patent
Monahan

(10) Patent No.: US 8,595,203 B2
(45) Date of Patent: *Nov. 26, 2013

(54) DIGITAL CONTENT HUB

(75) Inventor: Jay Monahan, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,935

(22) Filed: Jul. 19, 2012

(65) Prior Publication Data

US 2012/0284134 A1   Nov. 8, 2012

Related U.S. Application Data

(63) Continuation of application No. 11/779,022, filed on Jul. 17, 2007, now Pat. No. 8,234,261.

(51) Int. Cl.
*G06F 7/00*   (2006.01)
*G06F 17/30*   (2006.01)

(52) U.S. Cl.
USPC .............................. 707/705; 707/707; 705/40

(58) Field of Classification Search
None
See application file for complete search history.

(56) References Cited

U.S. PATENT DOCUMENTS

| | | | |
|---|---|---|---|
| 6,807,539 B2 | 10/2004 | Miller et al. | |
| 7,562,112 B2 | 7/2009 | Harrow et al. | |
| 7,571,121 B2 | 8/2009 | Bezos et al. | |
| 7,587,367 B2 | 9/2009 | Mengerink | |
| 7,599,922 B1 | 10/2009 | Chen et al. | |
| 7,680,804 B2 | 3/2010 | Upendran et al. | |
| 7,702,636 B1 | 4/2010 | Sholtis et al. | |
| 7,730,176 B1 | 6/2010 | Ishikawa et al. | |
| 7,747,603 B2 | 6/2010 | Apparao et al. | |
| 7,779,097 B2 | 8/2010 | Lamkin et al. | |
| 7,801,890 B1 | 9/2010 | Alexander | |
| 7,802,207 B2 | 9/2010 | Agboatwalla et al. | |
| 7,827,183 B2 | 11/2010 | Fraser et al. | |
| 8,078,602 B2 * | 12/2011 | Martin | 707/706 |
| 8,234,261 B2 | 7/2012 | Monahan et al. | |
| 8,266,173 B1 * | 9/2012 | Reztlaff et al. | 707/780 |
| 2001/0049676 A1 | 12/2001 | Kepler et al. | |
| 2002/0152267 A1 | 10/2002 | Lennon | |
| 2003/0126120 A1 | 7/2003 | Faybishenko et al. | |
| 2003/0149628 A1 * | 8/2003 | Abbosh et al. | 705/16 |
| 2003/0158839 A1 | 8/2003 | Faybishenko et al. | |
| 2004/0093302 A1 * | 5/2004 | Baker et al. | 705/37 |
| 2004/0175159 A1 | 9/2004 | Oetzel et al. | |
| 2005/0027699 A1 | 2/2005 | Awadallah et al. | |
| 2005/0149458 A1 * | 7/2005 | Eglen et al. | 705/400 |

(Continued)

OTHER PUBLICATIONS

"U.S. Appl. No. 11/779,022 , Response filed Dec. 15, 2011 to Non final Office Action mailed Sep. 16, 2011", 16 pgs.

(Continued)

*Primary Examiner* — Wilson Lee
*Assistant Examiner* — Jessica N Le
(74) *Attorney, Agent, or Firm* — Schwegman Lundberg & Woessner, P.A.

(57) ABSTRACT

There are provided methods and systems to retrieve search result information and digital content. The system receives input information identifying a plurality of data sources from which to retrieve digital content. Next the system retrieves search result information, over the network, from the plurality of data sources based on the input information. Next the system retrieves the digital content, over the network, from at least one of the data sources based on the search result information. Finally, the system communicates digital content to a client machine.

29 Claims, 21 Drawing Sheets

(56) References Cited

U.S. PATENT DOCUMENTS

| | | | |
|---|---|---|---|
| 2005/0202385 A1* | 9/2005 | Coward et al. | 434/307 R |
| 2005/0234818 A1* | 10/2005 | Marshall | 705/40 |
| 2005/0278321 A1* | 12/2005 | Vailaya et al. | 707/3 |
| 2006/0129578 A1 | 6/2006 | Kim | |
| 2006/0190973 A1 | 8/2006 | Fernung et al. | |
| 2006/0200413 A1* | 9/2006 | Kessel et al. | 705/50 |
| 2006/0242681 A1 | 10/2006 | Brain et al. | |
| 2006/0265331 A1* | 11/2006 | Hughes et al. | 705/52 |
| 2006/0265427 A1 | 11/2006 | Cohen et al. | |
| 2007/0033632 A1 | 2/2007 | Baynger et al. | |
| 2007/0050406 A1* | 3/2007 | Byers | 707/104.1 |
| 2007/0073767 A1 | 3/2007 | Springer, Jr. et al. | |
| 2007/0100650 A1 | 5/2007 | Ramer et al. | |
| 2007/0106650 A1 | 5/2007 | Moore | |
| 2007/0171903 A1 | 7/2007 | Zeng et al. | |
| 2007/0232342 A1 | 10/2007 | Larocca | |
| 2008/0082688 A1* | 4/2008 | Yi et al. | 709/246 |
| 2008/0098450 A1* | 4/2008 | Wu et al. | 725/132 |
| 2008/0222201 A1 | 9/2008 | Chen et al. | |
| 2008/0243903 A1 | 10/2008 | Vidos et al. | |
| 2008/0275893 A1 | 11/2008 | Bodin et al. | |
| 2009/0006624 A1 | 1/2009 | Alkove et al. | |
| 2009/0017805 A1 | 1/2009 | Sarukkai et al. | |
| 2009/0024631 A1 | 1/2009 | Monahan | |
| 2009/0043907 A1 | 2/2009 | Peterson et al. | |
| 2009/0204533 A1* | 8/2009 | Kocher | 705/37 |
| 2009/0328236 A1 | 12/2009 | Schmelzer | |
| 2010/0158479 A1 | 6/2010 | Craner | |

OTHER PUBLICATIONS

"U.S. Appl. No. 11/779,022 Non-Final Office Action mailed Oct. 6, 2010", 14 pgs.

"U.S. Appl. No. 11/779,022, Advisory Action mailed May 24, 2011", 2 pgs.

"U.S. Appl. No. 11/779,022, Advisory Action mailed Jul. 14, 2010", 3 pgs.

"U.S. Appl. No. 11/779,022, Examiner Interview Summary filed Sep. 13, 2010", 3 pgs.

"U.S. Appl. No. 11/779,022, Examiner Interview Summary mailed Aug. 20, 2010", 3 pgs.

"U.S. Appl. No. 11/779,022, Final Office Action mailed Apr. 29, 2010", 15 pgs.

"U.S. Appl. No. 11/779,022, Final Office Action mailed Mar. 11, 2011", 19 pgs.

"U.S. Appl. No. 11/779,022, Non Final Office Action mailed Sep. 16, 2011", 18 pgs.

"U.S. Appl. No. 11/779,022, Non-Final Office Action mailed Oct. 21, 2009", 13 pgs.

"U.S. Appl. No. 11/779,022, Response filed Jan. 21, 2010 to Non Final Office Action mailed Oct. 21, 2009", 13 pgs.

"U.S. Appl. No. 11/779,022, Response filed May 11, 2011 to Final Office Action mailed Mar. 11, 2011", 18 pgs.

"U.S. Appl. No. 11/779,022, Response filed Jun. 13, 2011 to Advisory Action mailed May 24, 2011 and Final Office Action mailed Mar. 11, 2011", 20 pgs.

"U.S. Appl. No. 11/779,022, Response filed Jun. 29, 2010 to Final Office Action mailed Apr. 29, 2010", 12 pgs.

"U.S. Appl. No. 11/779,022, Response filed Jun. 6, 2011 to Non Final Office Action mailed Oct. 6, 2010", 15 pgs.

"U.S. Appl. No. 11/779,022, Response to Rule 312 Communication mailed Jul. 5, 2012", 2 pgs.

"U.S. Appl. No. 11/779,022, Notice of Allowance maled Mar. 23, 2012", 16 pgs.

* cited by examiner

RECOMMENDATION INFORMATION

| | | |
|---|---|---|
| ENABLED | RETRIEVE CONTENT | PURCHASE CONTENT |
| X  /752 | 3  /754 | 4  /756 |

GLOBAL PURCHASE INFORMATION

| | |
|---|---|
| ONE TIME PURCHASE NOT TO EXCEED | $250  /758 |
| ONE MONTH SUBSCRIPTION NOT TO EXCEED | $100  /760 |
| ONE YEAR SUBSCRIPTION NOT TO EXCEED | $250  /762 |
| TOTAL PURCHASES NOT TO EXCEED | $500  /764 |

PAYMENT METHOD INFORMATION

| | |
|---|---|
| TYPE | VISA  /766 |
| NUMBER | 1234 5678 9012 1234  /768 |
| CARDHOLDER NAME | JOHN DOE  /770 |
| BILLING ADDRESS | JOHN DOE<br>1234 MAIN ST.<br>GOTHAM CITY, NY 12345  /772 |

GLOBAL STORAGE INFORMATION

| | | |
|---|---|---|
| STORAGE MAXIMUM | 10  /774 | GIGABYTES |
| STORAGE MAXIMUM PER DAY | 1  /776 | MEGABYTES |
| STORAGE RULE | MAXIMUM STORAGE FOR SHAWN MULLINS AND RINGO STAR IS 1 GIGABYTE.  /778 | |

*FIG. 25*

| | | | | |
|---|---|---|---|---|
| Folder Title | Item | Qty | Price | Subtotal |
| Shawn Mulilns | Music Video - 9$^{th}$ Ward Pickin' Parlor<br>Data Source - awarestore.com<br>TO PLAY SELECT HERE | 1 | US $15.00 | |
| Shawn Mullins | Album – The Essential Shawn Mullins<br>Data Source - iTunes.com<br>TO PLAY SELECT HERE | 1 | US $10.00 | |
| Shawn Mullins | Album – First Ten Years<br>Data Source - iTunes.com<br>TO PLAY SELECT HERE | 1 | US $10.00 | |
| | | | Buyer Total: | US $40.00 |

810 — RECEIPT INFORMATION
900
902 — Folder Title
906 — Method of Payment
904 — Buyer Total Method of Payment Credit Card: VISA
1234 5678 9012 1234
04.28.2007
AUTHORIZATION 123456789

*FIG. 28*

DIGITAL CONTENT HUB

RELATED

This application is a continuation of U.S. application Ser. No. 11/779,022, filed Jul. 17, 2007, which is incorporated herein by reference in its entirety.

FIELD

Embodiments relate generally to the technical field of data communications and, in one example embodiment, to methods and systems to retrieve search result information and digital content.

BACKGROUND

Searching for information and digital content on a network presents many challenges. One challenge is the time required to find and retrieve the desired information and digital content. For example, a user may consume considerable time operating a personal computer to visit web sites and media stores to locate specific types of digital content. Further, requesting delivery of digital content that is published to a feed may also require time to locate the feed and time to filter undesirable information and digital content that is published to the feed. Other challenges include organizing, storing, and budgeting payments for digital content.

BRIEF DESCRIPTION OF DRAWINGS

The present invention is illustrated by way of example and not limitation in the figures of the accompanying drawings, in which like references indicate similar elements and in which:

FIG. 8 is a flow chart illustrating a method, according to an embodiment, to communicate digital content to the portable control node;

FIGS. 20-28 are diagrams illustrating user interfaces, according to an embodiment;

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Figure 1:
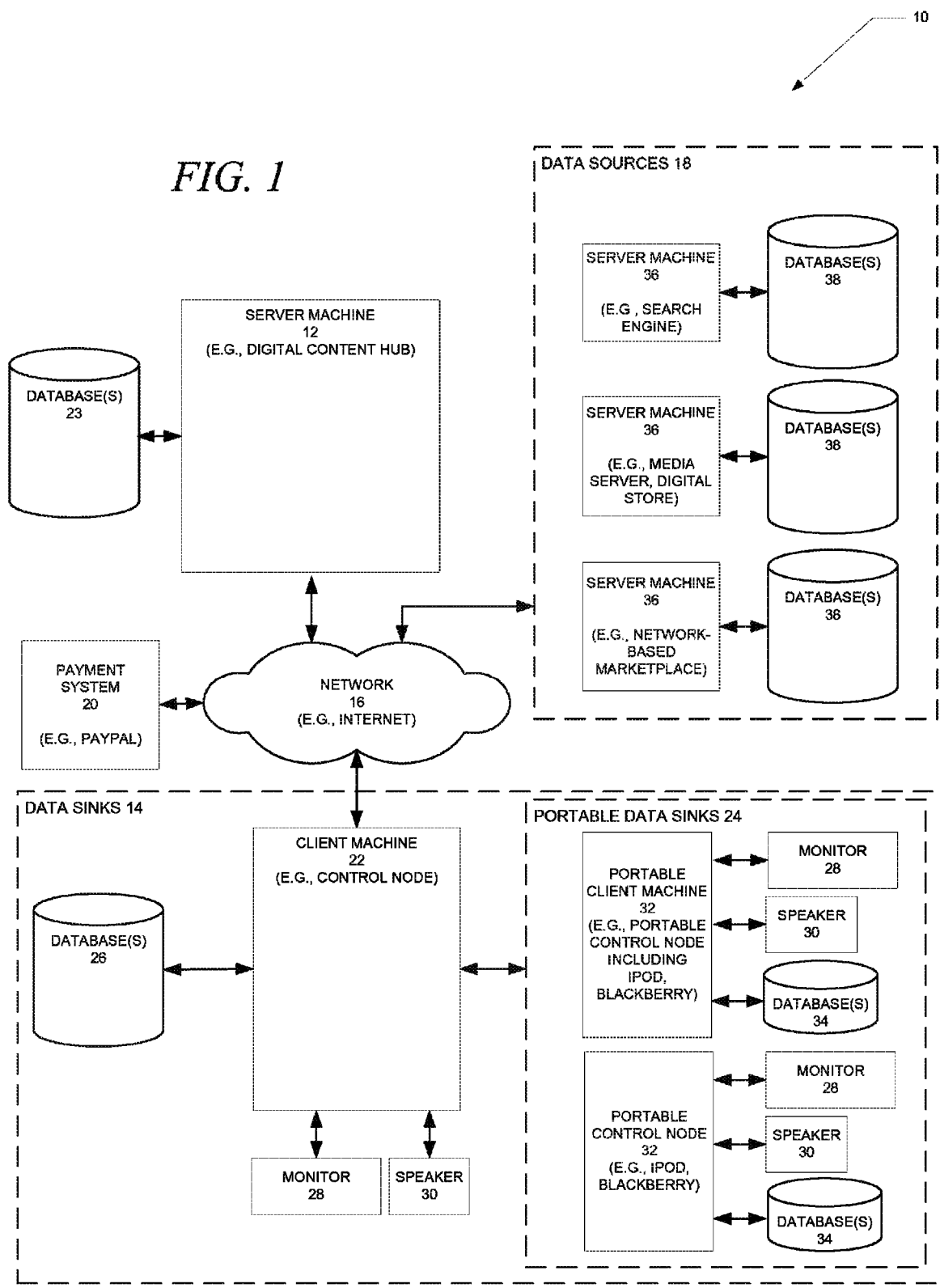
FIG. 1 is a network diagram depicting a system, according to one example embodiment, having a client-server architecture.

FIG. 1 is a network diagram depicting a system 10, according to one example embodiment to retrieve and communicate output information including digital content. The system 10 is shown to include a server machine 12 (e.g., digital content hub), data sinks 14, and data sources 18. Broadly, the server machine 12 (e.g., digital content hub) receives input information over a network 16 (e.g., Internet) from the data sinks 14 and periodically retrieves output information including digital content, over the network 16, from multiple data sources 18 based on the input information before communicating the retrieved output information, over the network 16, to the data sinks 14. The server machine 12 may receive the input information from a user that operates the data sinks 14 and may store the input information on a database 23 for continual and periodic retrieval of the digital content and other output information. In addition, the server machine 12 may also be authorized by the data sinks 14 to make a payment, over the network 16, to a payment system 20 as required for the retrieval of the output information including the digital content. Accordingly, the retrieved output information is targeted to the tastes and preferences of the user. This may serve to automate and streamline the tasks required to continually identify, filter, and retrieve digital content and other output information, that are of interest to the user.

The data sinks 14 may include a client machine 22 (e.g., control node) and portable data sinks 24. The data sinks 14 may be used to request, store, manage, and play digital content. The portable data sinks 24 include portable client machines 32 (e.g., IPOD) or other content storage and reproduction devices). The client machine 22 may operate as a control node that may receive input information from a user and communicate the input information to the digital content hub that, in turn, uses the input information to retrieve the digital content and other output information. The client machine 22 is shown to be coupled to a database 26 for storing the input and output information and a monitor 28 and speaker 30. The portable data sinks 24 are shown to include two portable client machines 32. The portable client machines 32 are respectively coupled to a monitor 28, speakers 30 and a database 34. The portable client machines 32 may be embodied as an IPOD made by APPLE INC. (Apple Computers) of Cupertino Calif., the BLACKBERRY™ wireless platform made by RESEARCH IN MOTION LIMITED (RIM) of Waterloo, Ontario or any other portable media playing device for playing, managing, and retrieving digital content.

The data sources 18 include server machines 36 respectively coupled to databases 38. In various embodiments the server machines 36 may host search engines such as the GOOGLE™ search engine by GOOGLE, INC. of Mountain View, Calif., media stores such as the ITUNES media store by APPLE INC. previously mentioned, network based marketplaces such as that operated by EBAY, INC. of San Jose, Calif., multimedia distribution platforms such as YOUTUBE also by GOOGLE, INC. of or any other network accessible platforms for retrieving output information.

Further, while the system 10 shown in FIG. 1 employs a client-server architecture, embodiments are of course not limited to such an architecture, and could equally well find application in a distributed, or peer-to-peer, architecture system. The server machine 12 and the client machine 22 may also host software modules and engines, as later described, that could also be implemented as standalone software programs, which do not necessarily have networking capabilities.

Figure 2:
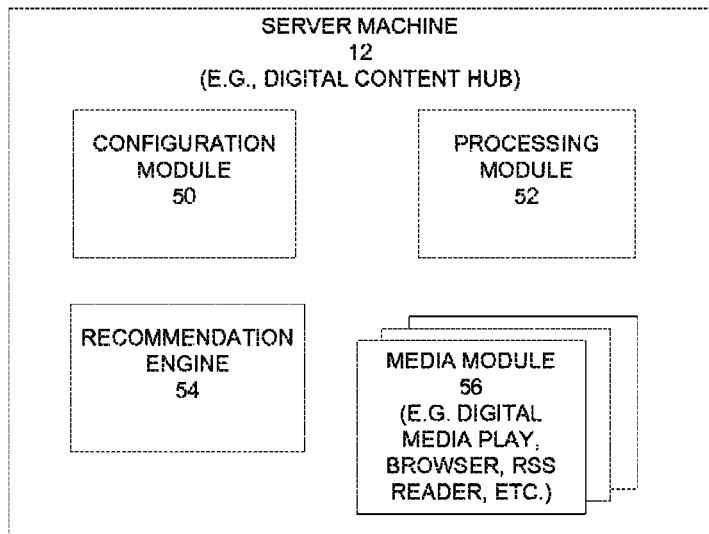
FIG. 2 is a block diagram illustrating modules and an engine, according to an embodiment, at a digital content hub.

FIG. 2 is a block diagram illustrating modules at server machine 12 (e.g., digital content hub), according to an embodiment. The digital content hub includes a configuration module 50, a processing module 52, a recommendation engine 54 and media modules 56. The configuration module 50 receives input information from the user (e.g., control node) or from the portable client machine 32 (e.g., portable control node) via the client machine 22 and utilizes the input information to generate metadata information. Further, the configuration module 50 uses the metadata information to retrieve search result information, including search result information entries, from the data sources 18. The processing module 52 may utilize the identified search result information entries (e.g., links to retrieve digital content) to retrieve digital content from the data sources 18. The media modules 56 may be used by the configuration module 50 to access the data sources 18 to retrieve the search result information. The media modules 56 may also be accessed by the processing module 52 to access the data sources 18 to retrieve the digital content. The media modules 56 may be embodied as a digital media player such as the ITUNES digital media player, a browser such as the INTERNET EXPLORER offered by MICROSOFT CORPORATION of Redmond, Wash., an RSS reader such as the GOOGLE RSS READER or any other module used to access output information over the network 16.

Figure 3:
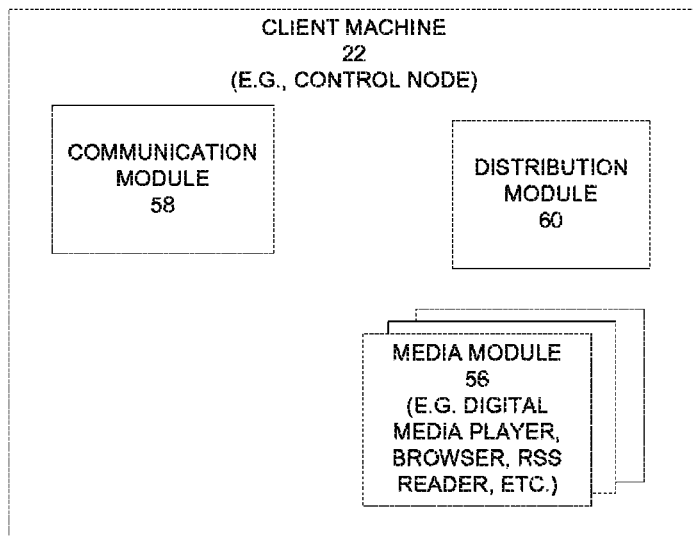
FIG. 3 is a block diagram illustrating modules, according to an embodiment, at a control node.

FIG. 3 is a block diagram illustrating modules at a client machine 22 (e.g., control node), according to an embodiment. The client machine 22 may include a communication module 58, a distribution module 60, and media modules 56. The communication module 58 may be used to receive input information from the user and communicate the input information to the server machine 12 (e.g., digital content hub). In addition, the communication module 58 may be used to receive input information from the portable client machine 32 (e.g., iPod) and communicate the input information to the server machine 12 (e.g., digital content hub). The communication module 58 may further receive digital content and other output information from the server machine 12 and store such information to memory or to the database 26.

The distribution module 60 communicates digital content to the portable client machine 32. In one embodiment, the distribution module 60 may communicate the digital content to the portable client machine 32 via a media module 56. In another embodiment the distribution module 60 may communicate the digital content to the portable client machine 32 via an Application Processing Interface (API). The distribution module 60 may communicate the digital content responsive to determining a portable client machine 32 is connected to the client machine 22. In another embodiment, the distribution module 60 may communicate the digital content responsive to a user requesting communication of the digital content.

Figure 4:
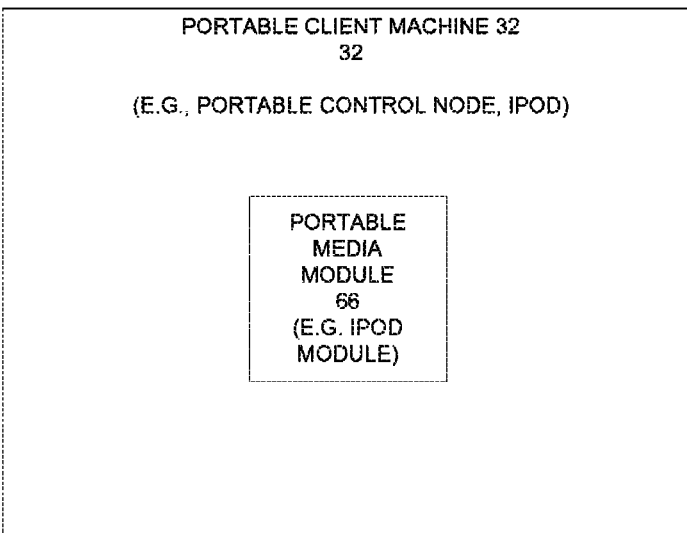
FIG. 4 is a block diagram illustrating modules, according to an embodiment, at a portable control node.

FIG. 4 is a block diagram illustrating modules at a portable client machine 32 (e.g., IPOD). The portable client machine 32 includes a portable media module 66. The portable media module 66 may receive input information from a user and communicate the input information to the client machine 22 (e.g., control node) that, in turn, communicates the input information to the server machine 12 (e.g., digital content hub). In addition, the portable media module 66 may generate recommendations for the acquisition of digital content that are communicated, as input information, to the client machine 22. Further, the portable media module 66 may receive digital content from the client machine 22 (e.g., control node) and be controlled by the user to manage and play the digital content.

Figure 5:
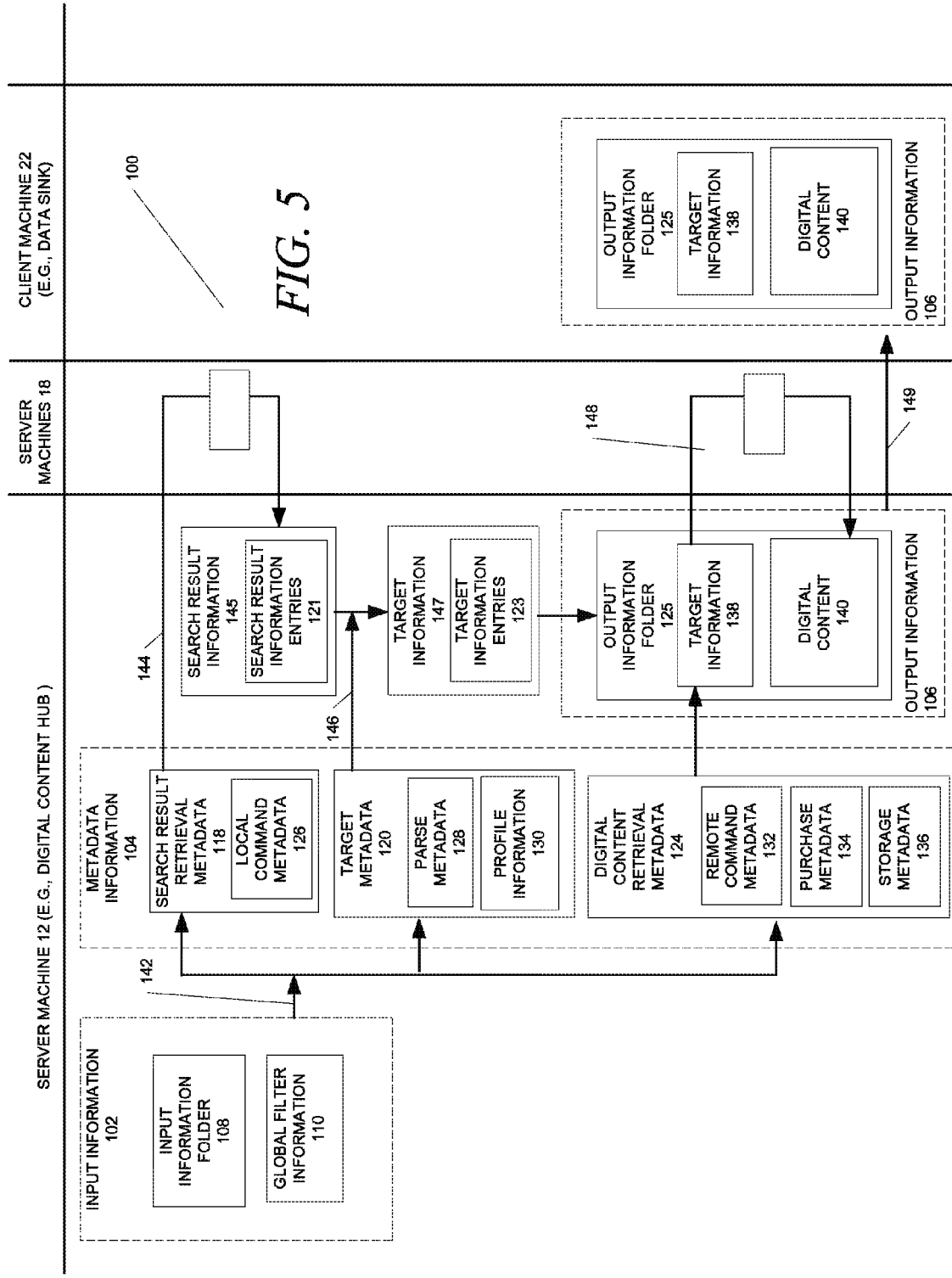
FIG. 5 is a block diagram illustrating a data flow, according to an embodiment.

FIG. 5 is a block diagram illustrating a dataflow 100 for the system 10, according to an embodiment. Illustrated on the left panel are data processing operations performed by a server machine 12 (e.g., digital content hub). Illustrated in the middle panel are data processing operations performed by a server machine 36 (e.g., data sources 18). Illustrated in the right panel are data processing operations performed by a client machine 22 (e.g., data sink 14). The dataflow 100 moves from left to right and starts at the server machine 12 (e.g., digital content hub).

Broadly, the server machine 12 (e.g., digital content hub) uses input information 102, that has been received from the client machine 22 (e.g., control node) or the portable client machine 24 (e.g., iPod) via the client machine 22, to generate metadata information 104 that, in turn, is used to retrieve output information (e.g., digital content) that is communicated to the client machine 22.

The input information 102 may be contained in an input information folder 108 and includes global filter information 110. The input information may describe artists that author the digital content, creations of digital content or categories describing digital content. The global filter information 112 may be used to filter retrieval of the digital content from the data sources. For example, the global filter information may be used to identify digital content that requires a purchase for an amount that exceeds a predetermined purchasing limitation before retrieving the digital content from the data source 18. Further, the global filter information may be used to filter retrieval of digital content that requires storage that exceeds a predetermined storage limitation before retrieving the digital content from the data source 18.

The metadata information 104 includes search result retrieval metadata 118, target metadata 120, and digital content retrieval metadata 124. The search result retrieval metadata 118 is used to retrieve search results information 145 from the data sources 18. The search result retrieval metadata 118 includes local command metadata 126 that may be used to generate commands. Examples of such commands include queries to retrieve the search result information 145 that includes search result information entries 121. The commands may be communicated directly through an Application Processing Interface to one of the server machines 36 (e.g., search engine). In another embodiment, the commands may be communicated via a media module 56 (e.g., ITUNES) that executes on the server machine 12. For example, the commands may be communicated to an ITUNES media player to advance the ITUNES media player through a series of user interfaces and request search result information (e.g., links to digital content). The ITUNES media player may, in turn, communicate the request for digital content to an ITUNES media store.

The target metadata 120 includes parse metadata 128 and profile information 130. The parse metadata 128 may be used by the seer machine 12 (e.g., digital content hub) to parse the search result information 145 to identify target information entries 123 (e.g., links to digital content, subscriptions to digital content, requested information, links to streaming digital content). The profile information 130 may include a history of input information and may be used by the server machine 12 (e.g., digital content hub) to further identify target information entries 123 from the search result information 145. For example, the profile information 130 may be based on input information 102 that is collected from the user over a predetermined and extended period of time. The profile information 130 may be used to generate a recommendation for each of the search result information entries 121.

The digital content retrieval metadata 124 includes remote command metadata 132, purchase metadata 134, and storage metadata 136. The remote command metadata 132 may be used to generate remote commands that are communicated in association with digital content to the client machine 22. The commands may be used at the client machine 22 to communicate the digital content to a portable client machine 32 (e.g., portable music player). For example, the remote command metadata 132 may include commands and/or other information that may be used at the client machine 22 to communicate digital content to the portable music player. The purchase metadata 134 may be used by the server machine 12 (e.g., digital content hub) to determine whether selecting a link to purchase digital content exceeds a purchase limitation such as a predetermined price. The storage metadata 136 may be used by the server machine 12 to determine whether retrieval of digital content exceeds a storage limitation such as a predetermined storage limitation.

The output information folder 106 includes target information 147, as previously described and digital content 140. The digital content 140 may include digital information in the form of movies, albums, songs, digital samples, multimedia presentations, videos, images, etc.

The dataflow is now described. At operation 142, the input information 102 that has been previously received from the client machine 22, or the portable client machine 32 via the client machine 22, may be used by the server machine 12 (e.g., digital content hub) to generate the metadata information 104. At operation 144, the metadata information 104 is used by the server machine 12 (e.g., digital content hub) to retrieve the search result information 145. For example, queries may be communicated to the data sources 18 that, in turn, respond by communicating the search result information 145. At operation 146, the target metadata 120 is used by the server machine 12 (e.g., digital content hub) to identify search result information entries 121 as target information entries 123. In addition, the profile information 130 may be used to generate a recommendation for each of the search result information entries 121. Finally, the search result information entries 121 associated with recommendations that exceed a predetermined limit may be identified as target information entries 123, as explained further below.

At operation 148, the digital content retrieval metadata 124 and the target information 147 may be used to retrieve digital content from the server machine(s) 36 (e.g., data sources 18). In some instances, the purchase metadata 134 and the storage metadata 136 may prohibit retrieval of digital content, as previously described. At operation 149 the target information 147 and the digital content 140, with associated remote commands, may be communicated to the client machine 22.

Figure 6:
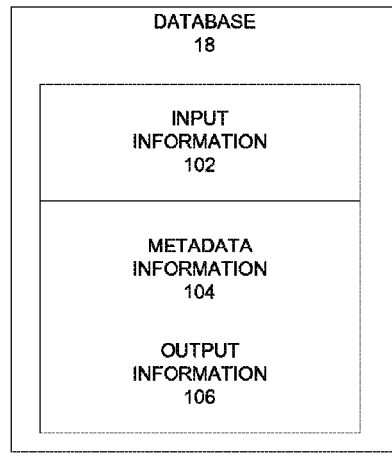
FIG. 6 is a block diagram illustrating a database, according to an embodiment, coupled to the digital content hub.

FIG. 6 is the block diagram illustrating a database 23 according to an embodiment, coupled to the server machine 12 (e.g., digital content hub). The database 23 may be used to store the input information 102, the metadata information 104, and the output information 106.

Figure 7:
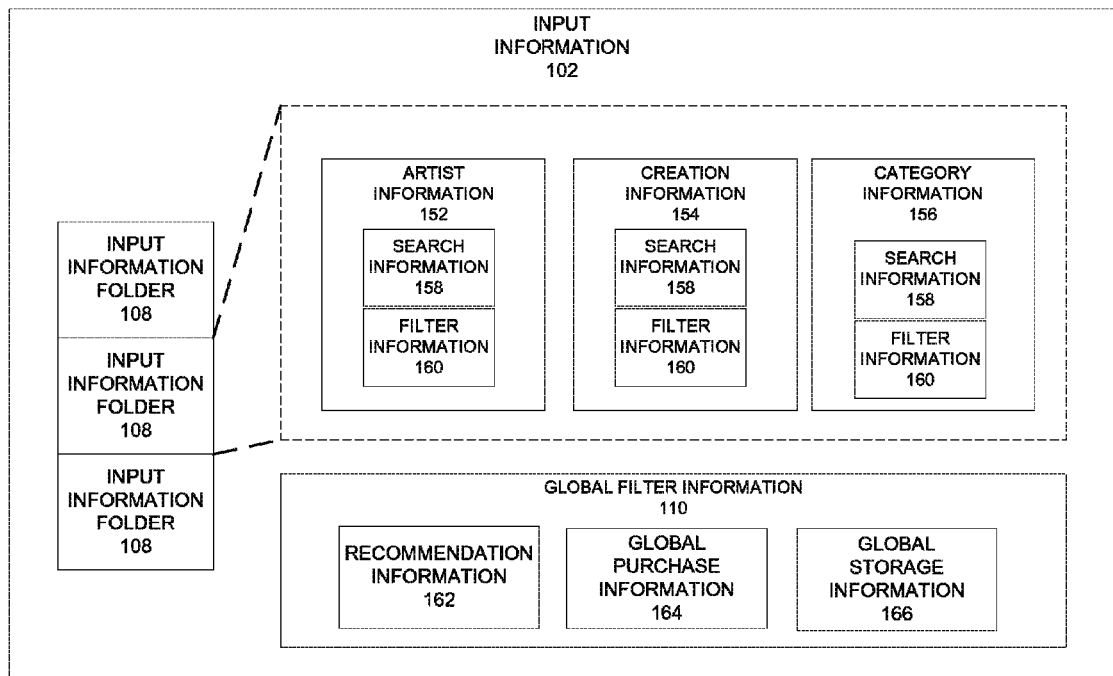
FIG. 7 is a block diagram illustrating input information, according to an embodiment.

FIG. 7 is a block diagram illustrating input information 102, according to an embodiment. The input information 102 includes input information folders 108 and global filter information 110. The server machine 12 (e.g., digital content hub) schedules the retrieval of search result information 145 and associated digital content 140 based on an input information folder 108 granularity. The input information folders 108 may be used to store the input information 102 for an artist, a creation, or a category. For example, the input information folder 108 may contain artist information 152, creation information 154, or category information 156. The artist information 152 may be used to identify output information 106 (e.g., digital content) associated (e.g., authored, produced, directed, edited, etc.) with an artist (e.g., Shawn Mullins, Frank Sinatra, Bob Dylan). The creation information 154 may be used to retrieve output information 106 associated with a creation (e.g., "Frozen Man," "Pirates of the Caribbean," "I Did It My Way," etc.). The category information 156 may be used to retrieve output information 106 associated with a category (e.g., Jazz, Jazz Artists, Best Movies of the Year, etc.) of digital content. The artist information 152, creation information 154, and category information 156 respectively include search information 158 and filter information 160. The search information 158 may be used to retrieve the search result information 145 and identify the target information 147 including digital content 140 from the search result information 145. The filter information 160 (e.g., predetermined criteria) may be used to determine whether the identified digital content 140 is prohibited from retrieval from the data sources 18.

The global filter information 110 (e.g., predetermined criteria) may be used to apply global filters across the input information folders 108. The global filter information 110 includes recommendation information 162, global purchase information 164, and global storage information 214. The recommendation information 162 may be used to generate recommendations from search result information 145, as previously described. The global purchase information 164 may be used to determine whether the digital content should be purchased based on a global filter. For example, the global filter may include a purchase limitation that prevents a one time purchase exceeding $50 notwithstanding the artist, creation or category. Another example of a global filter may include a storage rule that applies to multiple artists or a combination of artists and categories. The global storage information may be used to determine whether the digital content is retrieved based on a global filter that operates as described, but in a context of storage limitations.

Figure 8:
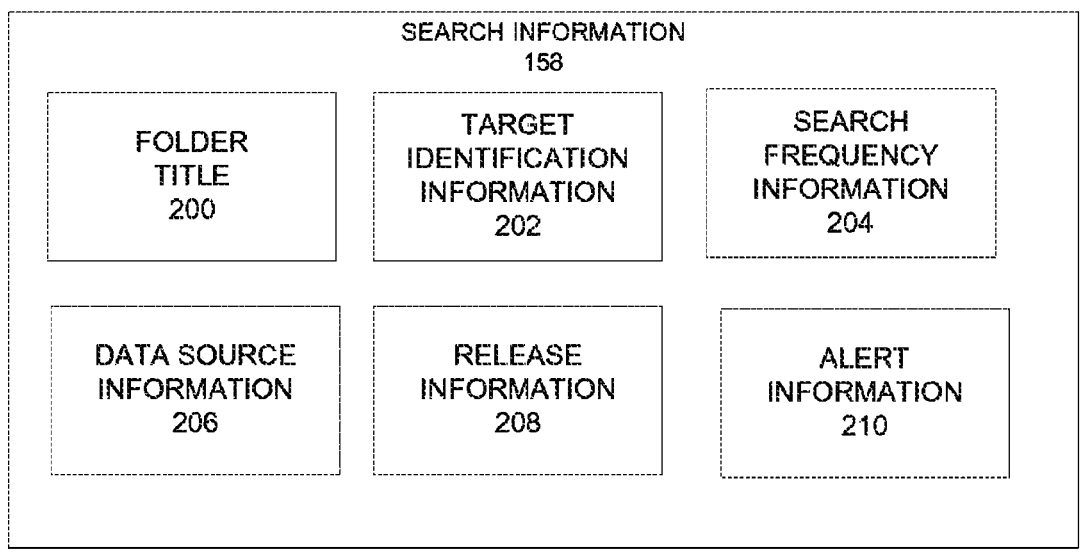
FIG. 8 is a block diagram illustrating search information, according to an embodiment.

FIG. 8 is a block diagram illustrating search information 158, according to an embodiment. The search information 158 includes a folder title 200, target identification information 202, search frequency information 204, data source information 206, release information 208, and alert information 210. The folder title 200 may be input by the user to name a corresponding input and output information folder 108, 106. The target identification information 202 may be used to identify different types of the digital content 140 or other information (e.g., targets) that are of interest to the user. The search frequency information 204 may be used to identify the frequency of initiating retrieval of search result information 145 and associated digital content 140. The data source information 206 may be used to identify the data sources 18 from which to retrieve the search result information 145 and the digital content 140. The release information 208 may be used to identify whether all releases of a type of digital content 140 are retrieved or a new release (e.g., not previously released) of digital content is retrieved. For example, the input checkbox 624 may receive a request to receive all releases of a type of digital content 140 and the input checkbox 626 may receive a request to receive a new release of digital content 140. The alert information 210 may be used to communicate an alert to a device over the network 16 responsive to predetermined criteria, such as retrieval of digital content.

Figure 9:
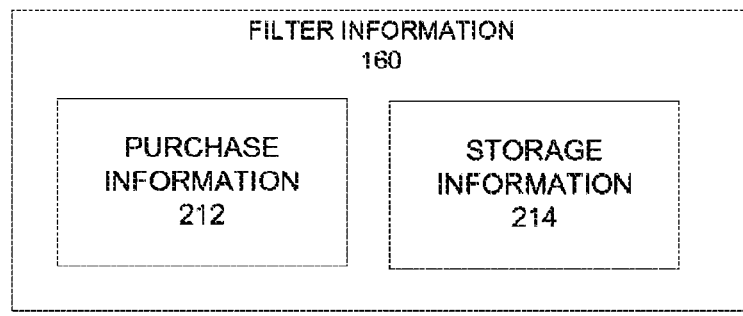
FIG. 9 is a block diagram illustrating filter information, according to an embodiment.

FIG. 9 is a block diagram illustrating filter information 160, according to an embodiment. The filter information 160 includes purchase information 212 and storage information 214 and is used as previously described but for a single input information folder 108 (e.g., a single artist, creation, or category).

Figure 10:
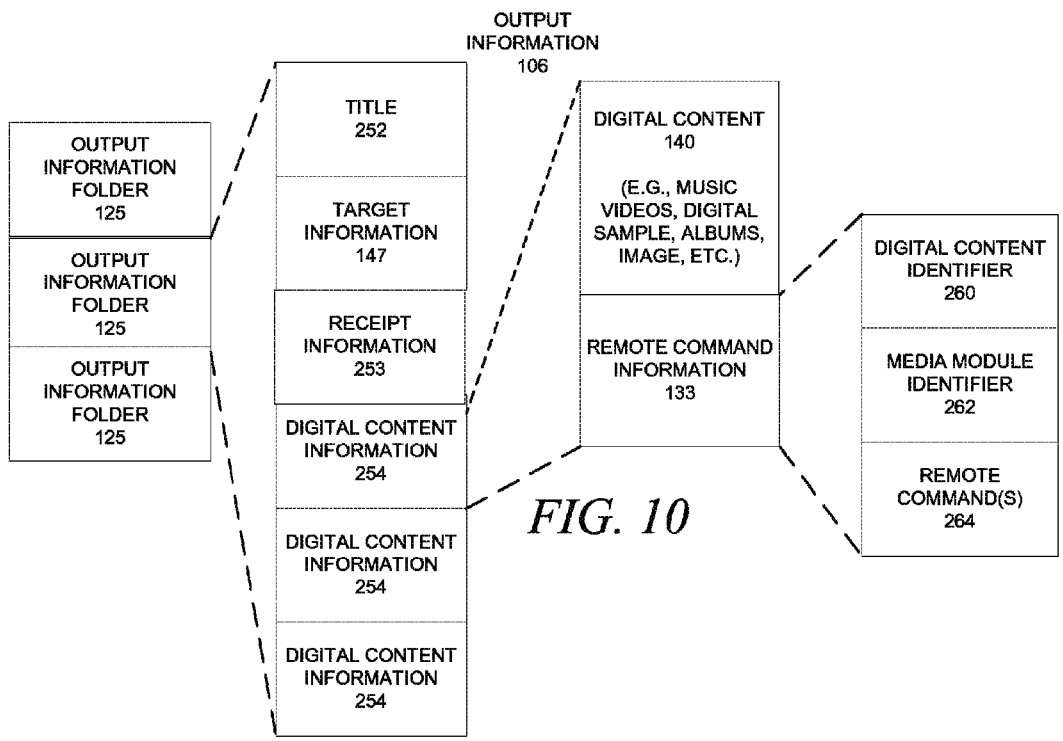
FIG. 10 is a block diagram illustrating output information, according to an embodiment.

FIG. 10 is a block diagram illustrating output information 106, according to an embodiment. The output information 106 may include multiple output information folders 250. The output information folder 250 includes a title 252, target information 147 and one or more digital content information 254 entries. The title 252 may be provided by the user and appears on user interfaces that display the output information folder 250. The target information 147 may include search result information 145 and digital content information 245. The digital content information 254 may include digital content 140, as previously described, and remote command information 258. The remote command information 258 may be communicated with the digital content 140 to the client machine 22 that, in turn, uses the remote command information 258 to communicate the digital content 140 to a portable client machine 32 (e.g., iPod).

Figure 11:
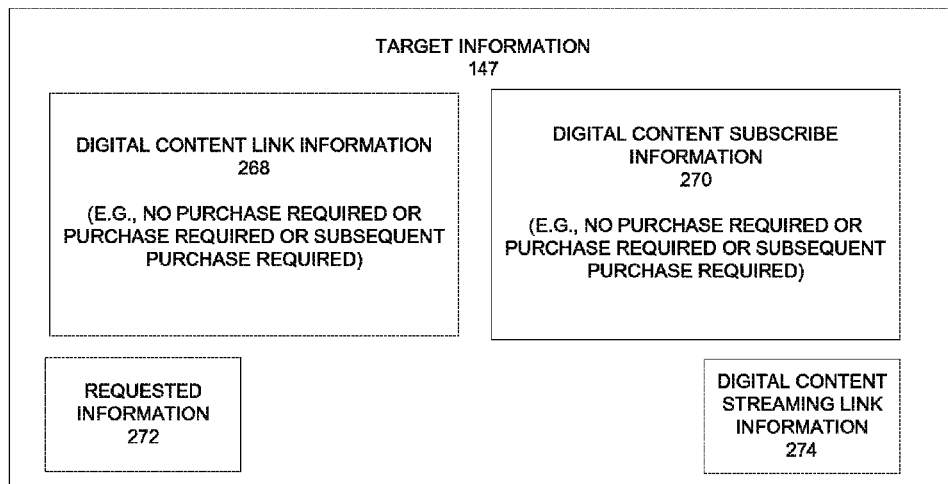
FIG. 11 is a block diagram illustrating target information, according to an embodiment.

FIG. 11 is a block diagram illustrating target information 147, according to embodiment. The target information 147 includes digital content link information 268, digital content subscribe information 270, requested information 272 and digital content streaming link information 274. The digital content link information 268 may include user interface elements (e.g., link) that may be selected to retrieve the digital content 140. In some instances, selection of the link may require a purchase to retrieve the digital content. In other instances, selection of the link may enable retrieval of the digital content 140 with a delayed purchase (e.g., at play time). The digital content subscribe information 270 may include user interface elements (e.g., link) that may be selected to subscribe to a feed (e.g., RSS feed) that communicates (e.g., publishes) search result information 145 digital content 140. In some instances, selection of the link may require a purchase to receive publications of the digital content. In other instances, selection of the link may enable receipt of publications of the digital content with a delayed purchase (e.g., at play time). The requested information 272 includes information identified by the user for retrieval form a data source 18. For example, the requested information 272 may include ticket availability information for concerts of an artist that performs. The digital content streaming link information 274 may include user interface elements that may be selected to initiate streaming of the digital content 140.

Figure 12:
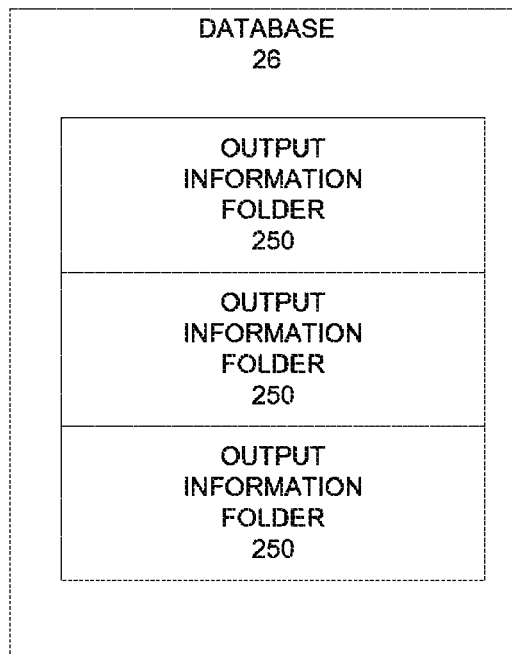
FIG. 12 is a block diagram illustrating a database, according to an embodiment, coupled to the control node.

FIG. 12 is a block diagram illustrating a database 26, according to an embodiment, coupled to the client machine 22 (e.g., control node). The database 26 may store output information folders 250, as previously described.

Figure 13:
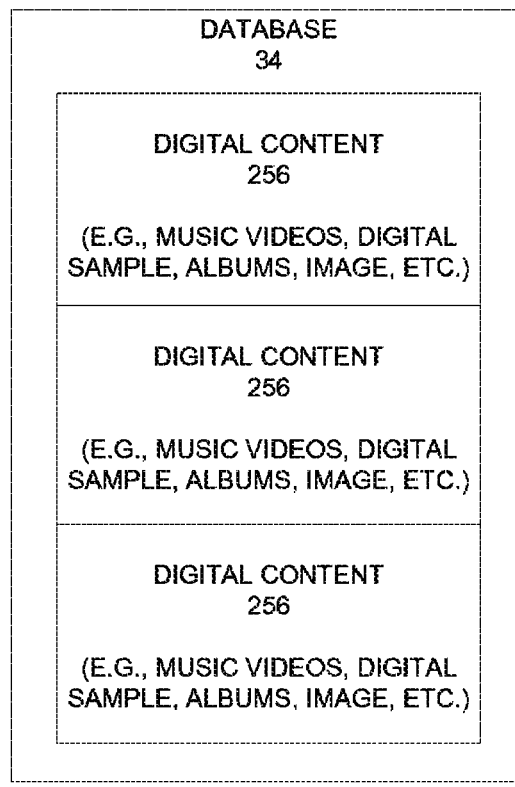
FIG. 13 is a block diagram illustrating a database, according to an embodiment, coupled to the portable control node.

FIG. 13 is a block diagram illustrating a database 34, according to an embodiment, coupled to a portable client machine 32 (e.g., a portable music player). The database 34 may store digital content 140, as previously described.

Figure 14:
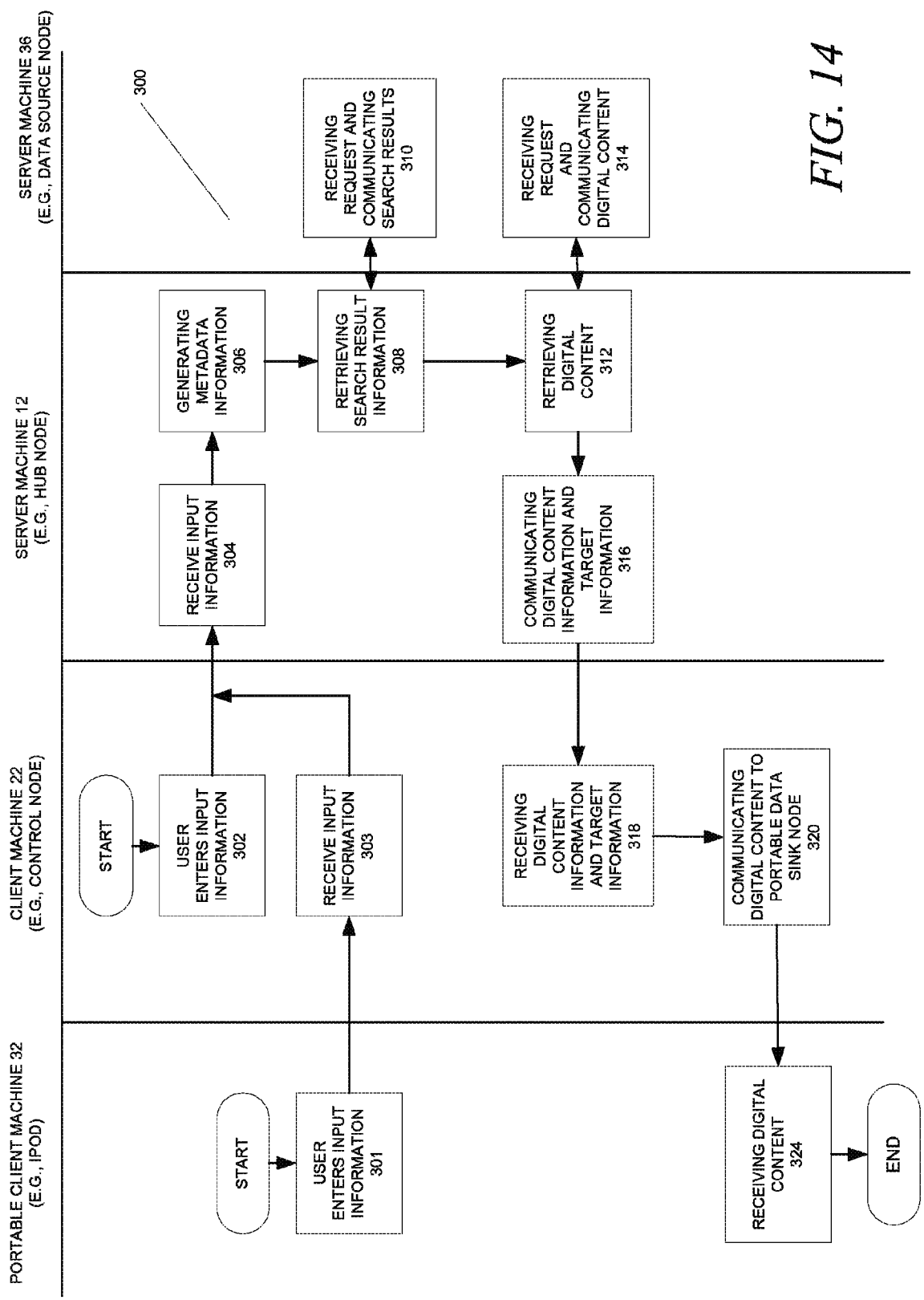
FIG. 14 is a flow chart illustrating a method, according to an embodiment, to retrieve search result information and digital content.

FIG. 14 is flowchart illustrating a method 300, according to an embodiment, to retrieve search result information 145 and digital content 140. Illustrated on the left panel is a portable client machine 32 and illustrated in the right panel is a server machine 36. Illustrated in the middle left panel is a client machine 22 and illustrated in the middle right panel is a server machine 12. The method 300 commences at operation 302, at the client machine 22, with the communication module 58 receiving input information 102. The communication module 58 receives the input information 102 and communicates the input information 102 to the server machine 12.

At operation 304, at the server machine 12, the configuration module 50 receives the input information 102. For example, the input information 102 may identify an artist, Shawn Mullins, and request retrieval of music videos authored by Shawn Mullins for communication to the client machine 22 and to the portable client machine 32. For example, the input information 102 may include a folder title 200 (e.g., Shawn Mullins), target identification information 202 (e.g., music videos, ticket availability), search frequency information 204 (e.g., once a day), data source information 206 (e.g., iTunes Store, etc.), release information 208 (e.g., new releases), alert information 210 (e.g., communicate an email if found), purchase information 212 (e.g., authorization to pay but not to exceed a predetermined limit) and storage information 214 (e.g., authorization to retrieve but not to exceed a predetermined limit).

At operation 306, the configuration module 50 generates metadata information 104 based on the received input information 102. At operation 308, the configuration module 50 utilizes the search retrieval metadata 118 to communicate commands (e.g., queries) to the data sources 18 to retrieve the search result information 145.

At operation 308, the processing module 52 may use the target metadata 120 to process the search result information 145. For example, the processing module 52 may use the target metadata 120 to identify target information entries 123 in the search result information 145 that may be selected to retrieve a music video by Shawn Mullins. At operation 310, the server machine 36 may receive commands including queries from the server machine 12 that may be processed to identify the search result information 145 and communicate the search result information 145 back to the server machine 12.

At operation 312, the processing module 52 utilizes the digital content retrieval metadata 124 and the search result information 145 to identify the target information 147. Next, the recommendation engine 54 uses the profile information 130 and the search result information 145 to identify target information 147. Finally, the processing module 52 utilizes the target information 147 to communicate commands including queries to the data sources to retrieve the digital content 140 from the server machine 36.

At operation 314, the server machine 36 may receive commands including queries from the server machine 12 that may be processed to identify the digital content 140 and communicate the digital content 140 back to the server machine 12.

At operation 316, at the server machine 12, the processing module 52 may communicate the digital content information 254 and the target information 147 to the client machine 22. For example, the digital content information 254 may include digital content 140 in the form of a Shawn Mullins music video and remote command information 133 to communicate the digital content 140 to a portable music player. Further, for example, the target information 147 may include the digital content link information 268 used to retrieve the Shawn Mullins music video and ticket availability information for Shawn Mullins concerts.

At operation 318, at the client machine 22, the communication module 58 receives the digital content information 254 and the target information 147 and stores the digital content information 254 and the target information 147 in the output information folder 125 associated with Shawn Mullins.

At operation 320, at the client machine 22, the distribution module 60 uses the media module identifier 262 to launch the appropriate media module 56 (e.g., iTunes) to communicate the associated digital content 140 to the portable client machine 32.

At operation 324, at the portable client machine 32, the portable media module 66 receives the digital content 140 and stores the digital content on the database 34.

In another embodiment, the input information 102 may be received from the portable client machine 32 and communicated to the server machine 12 via the client machine 22. For example, at operation 301, the user may enter input information 102 at the portable client machine 32 which, in turn, communicates the input information 102 to the client machine 22. At operation 303, at the client machine 22, the communication module 58 may receive the input information 102 and communicate the input information 102 to the server machine 12 (e.g., digital content hub).

It will further be appreciated that the above described method 300 to retrieve search result information 145 and digital content 140 may be initiated responsive to receipt of input information 102 or responsive to the configuration module 50 determining a search has been scheduled based on search frequency information 204 associated with an input information folder is requiring initiation.

Figure 15:
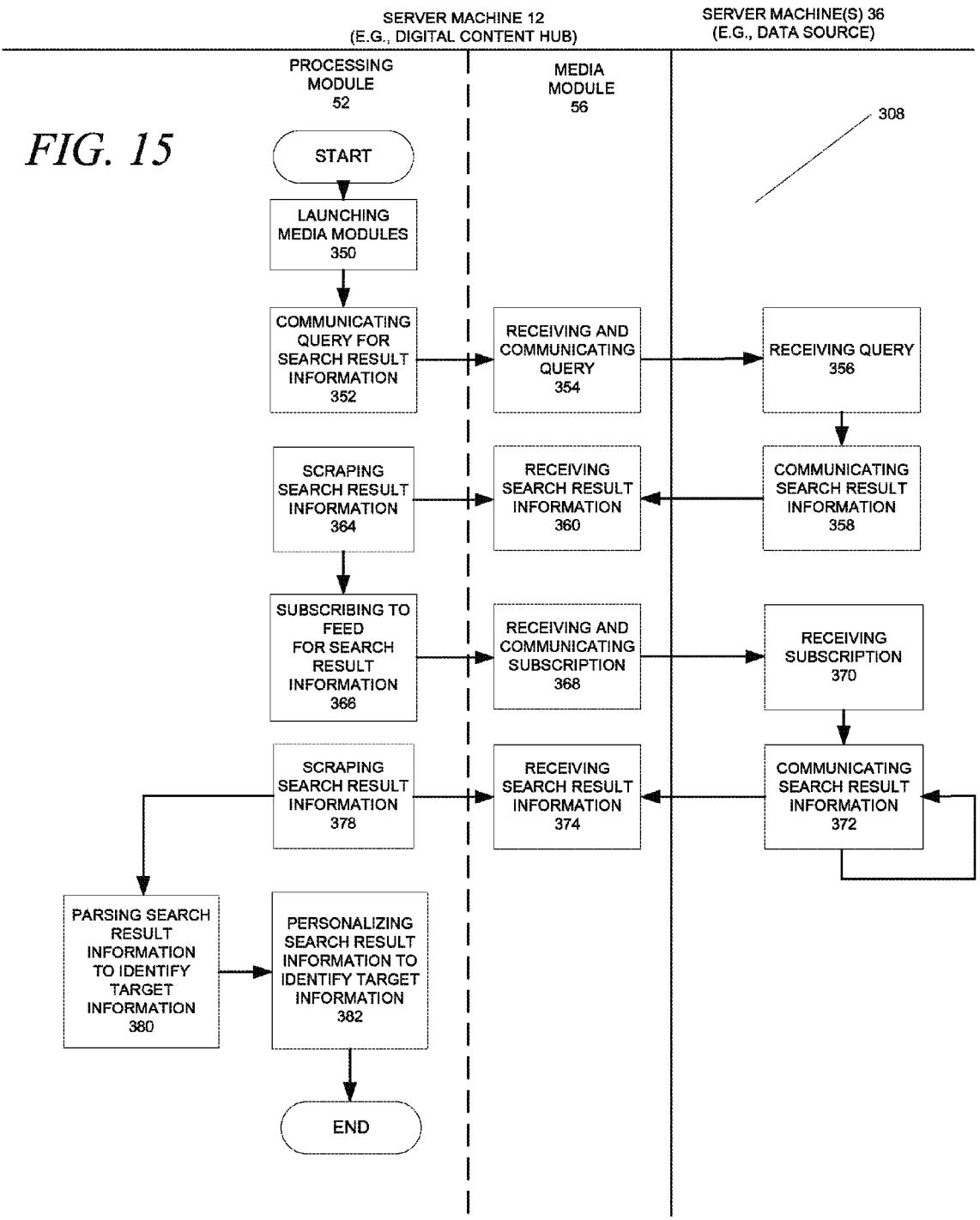
FIG. 15 is a flow chart illustrating a method, according to an embodiment, to retrieve search result information.

FIG. 15 is a flowchart illustrating a method 308, according to an embodiment, to retrieve search result information 145. Illustrated on the left panel are operations performed by the server machine 12 (e.g., digital content hub) and illustrated on the right panel are operations performed by the server machines 36 (e.g., data sources 18). With respect to the left panel, operations on the left are performed by the processing module 52 operations on the right are performed by the media module 56. The method 308 commences at operation 350 with the processing module 52 launching media modules 56 based on data source information 206 in the input information folder 108 associated with Shawn Muffins. At operation 352, the configuration module 50 communicates a query for search result information 145. For example, the configuration module 50 may use the local command metadata 126 to generate the appropriate commands including queries to be communicated to the media module 56. Accordingly, one embodiment may include a sequence of commands to provide a user name and password to the media module 56 and navigate through a series of user interfaces displayed by the media module 56 before communicating a query to the media module 56 for the desired digital content 140. At operation 354, the media module 56 receives the commands including a query and communicates the commands to the appropriate server machine 36. At operation 356, at the data source 18, the query is received and at operation 358 the data source 18 communicates the search result information 145 to the server machine 12.

At operation 360, at the server machine 12 (e.g., digital content hub), the media module 56 receives the search result information 145 and at operation 354, the configuration module 50 scrapes the search result information 145 from the media module 56 user interface.

At operation 366, the processing module 52, at the server machine 12, subscribes to a feed for search result information 145. For example, the processing module 52 may subscribe to a feed that advertises Shawn Mullins music videos that are available for purchase on release of the music video. At operation 368, at the server machine 12 (e.g., digital content hub), the media module 56 receives and communicates the subscription to the data source 18. At operation 370, the data source 18 (e.g., iTunes Store) receives the subscription and at operation 372, the data source 18 communicates the search result information 145 (e.g., advertisement to purchase Shawn Mullins music video) to the server machine 12 (e.g., digital content hub) responsive to the subscription. Further, at operation 372, the data source 18 continues to communicate or publish search result information 145 to the media module 56, at the server machine 12 (e.g., digital content hub), as it becomes available.

At operation 374, at the server machine 12, the media module 56 (e.g., iTunes) receives the search result information 145 and at operation 378, the configuration module 50 scrapes the search result information 145 from the media module 56 user interface.

At operation 380, the processing module 52, at the server machine 12 (e.g., digital content hub), processes the search result information 145 to identify the target information 147. For example, the processing module 52 may use the parse metadata 128 that was generated based on the search information associated with a particular input information folder 106 (e.g., Shawn Mullins) and the search result information 145 to identify search result infbrmation entries 121 as target information entries 123. The target information entries 123 may be in the form of digital content link information 268 or digital content subscribe information 270 or requested information 272 or digital content streaming link information 274.

At operation 382, the recommendation engine 54 parses the search result information 145 to identify additional target information 147. For example, the recommendation engine 54 may use the profile information 130 to parse the search result information entries 121 and associate a recommendation with each of the search result information entries 121. The recommendation engine 54 may use a star scheme with the highest recommendation being four stars. In addition, the recommendation engine may determine that a search result information entry 121 that is associated with a recommendation that exceeds a predetermined threshold is identified a target information entry 123. For example, a search result information entry 121 that is associated with a recommendation of three stars may exceed a predetermined threshold of two stars thereby triggering identification as a target information entry 123.

It will be appreciated that the above described method 308 to retrieve search result information 145 may include launching multiple media modules 56 to retrieve the search result information 145. It will further be appreciated that the configuration module 50 is not required to utilize a media module 56 to retrieve the search result information 145 but may communicate directly with the data sources via an application processing interface.

Figure 16:
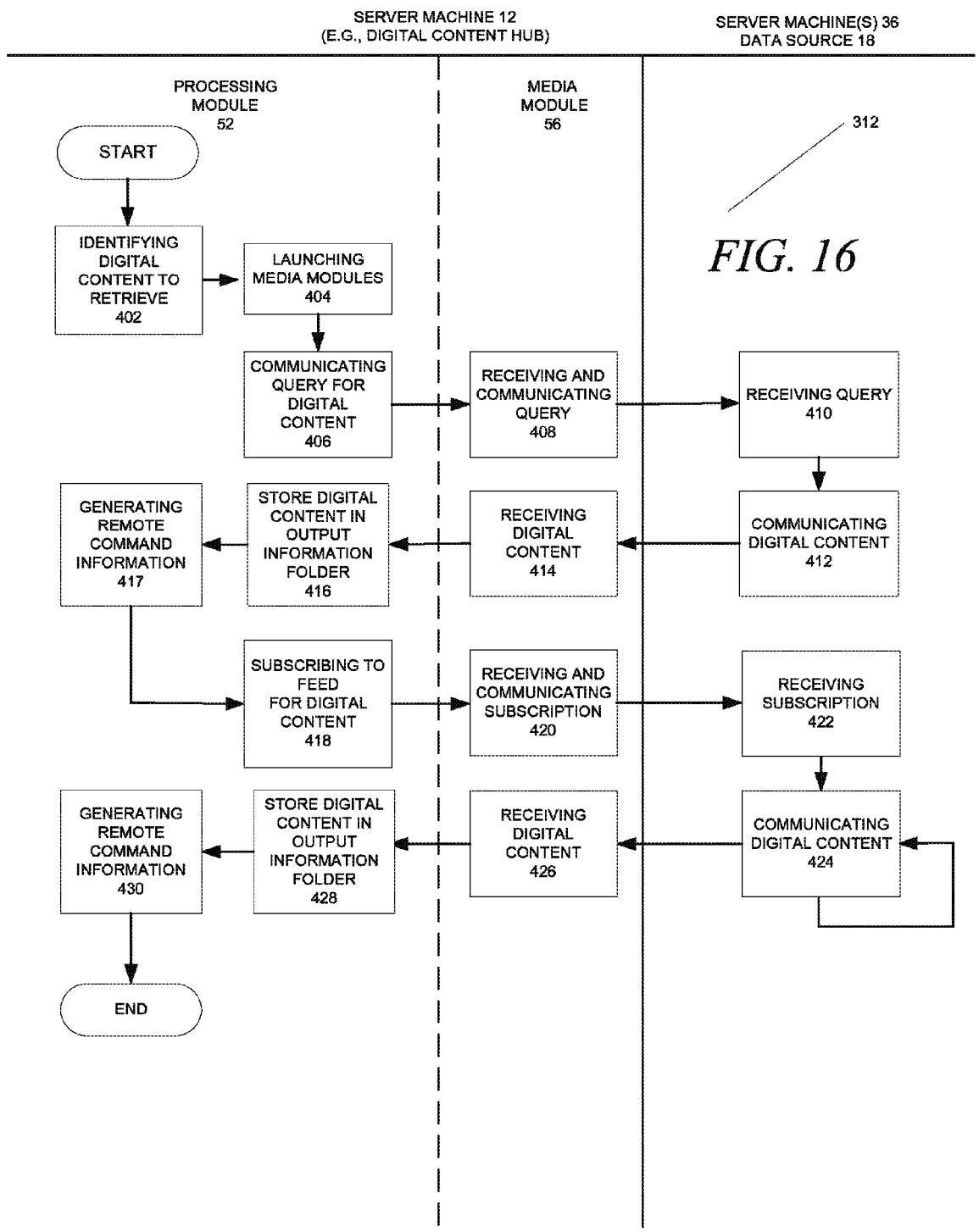
FIG. 16 is a flow chart illustrating a method, according to an embodiment, to retrieve digital content.

FIG. 16 is a flowchart illustrating a method 312, according to an embodiment, to retrieve digital content 140. Illustrated on the left panel are operations performed by the server machine 12 (e.g., digital content hub), and illustrated on the right panel are operations performed by the data source 18. At the left panel and illustrated on the left are operations performed by the processing module 52 and illustrated on the right are operations performed by the media module 56. The method 400 commences at operation 402 at the server machine 12 (e.g., digital content hub) with the processing module 52 identifying digital content 140 to retrieve. For example, the processing module 52 may use the purchase metadata 134 and the storage metadata 136 to determine whether to retrieve digital content 140 identified by digital content link information 268. At operation 404, the processing module 52 launches the appropriate media modules 56 to retrieve the digital content 140. At operation 406, at the server machine 12 (e.g., digital content hub), the processing module 52 communicates commands including a query for a digital content 140 via the media module 56. At operation 408, the media module 56 receives and communicates the query to the appropriate data source 18.

At operation 410, at the data source 18, the query is received and at operation 412, the data source 18 communicates the digital content 140 to the server machine 12 (e.g., digital content hub).

At operation 414, at the server machine 12 (e.g., digital content hub), the media module 56 receives the digital content 140. At operation 416, the processing module 52 stores the received digital content 140 in the appropriate output information folder 250. For example, a Shawn Mullins music video would be stored in the Shawn Mullins folder. At operation 417, the processing module 52 generates remote command information 133 responsive to receipt of the digital content 140. For example, the processing module 52 may generate the digital content identifier 260 for the Shawn Mullins music video, the media module identifier 262 to identify the iTunes media module 56 and remote commands 264 to command the iTunes media module 56.

At operation 418, the processing module 52, subscribes to a feed for digital content 140. For example, subscription to the feed may result in receiving the digital content 140 as it is released. At operation 420, the media module 56 communicates the subscription to the appropriate data source 18.

At operation 422, at the data source 18, the subscription is received and at operation 424, the data source 18 communicates or publishes the digital content 140 to the server machine 12 (e.g., digital content hub) as it becomes available. At operation 426, at the server machine 12 (e.g., digital content hub), the media module 56 receives the digital content 140. At operation 428, the processing module 52 stores the published digital content 140 in the appropriate output information folder 250. At operation 430, the processing module 52 may generate remote command information 258 for the received digital content 140 and store the remote command information 258 in the appropriate output information folder 250.

It will be appreciated that multiple media modules 56 may be launched to retrieve the digital content 140. It will further be appreciated that the configuration module 50 need not utilize a media module 56 to retrieve the digital content 140 but may communicate directly with the data sources 18 via an application processing interface.

Further, while the above described embodiment of the method 312 describes a subscription for the digital content 140 that may be communicated to the data source (e.g., iTunes Store) via the media module 56 (e.g., iTunes) it will be appreciated that the subscription may include a criterion to retrieve the digital content 140. For example, the criterion to retrieve the digital content may include search information 158 (e.g., release information 208) and/or filter information 160 (e.g., purchase information 212 and/or storage information 214), and/or an authorization to push the digital content 140 based on a recommendation of the data source 18 (e.g., iTunes Store).

Figure 17:
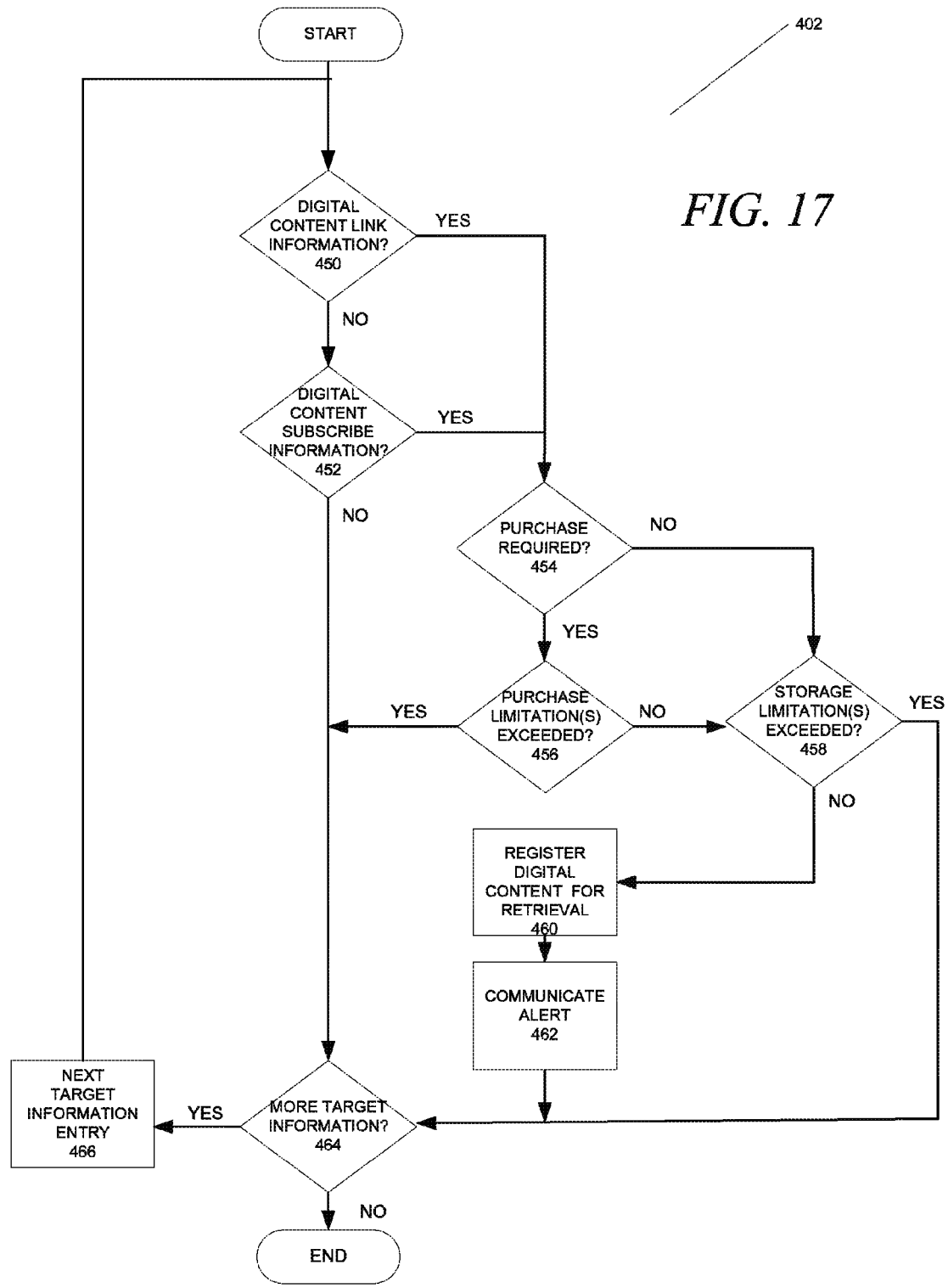
FIG. 17 is a flow chart illustrating a method, according to an embodiment, to identify digital content to retrieve.

FIG. 17 is a flowchart illustrating a method 402, according to an embodiment, to identify digital content to retrieve. At decision operation 450, at the server machine 12 (e.g., digital content hub) the processing module 52 determines whether the next target information entry 123 is a digital content link information 268. If the target information entry 123 is digital content link information 268, then a branch is made to decision operation 454. Otherwise, processing continues at decision operation 452.

At decision operation 452, the processing module 52 determines if the target information entry 123 is a link to subscribe to digital content 140 (e.g., digital content subscribe information 270). If the target information entry 123 is digital content subscribe information 270, then a branch is made to decision operation 454. Otherwise, processing continues at decision operation 464.

At decision operation 454, the processing module 52 determines if a purchase is required to request the digital content 140 or to subscribe for the digital content 140. If a purchase is required, then a branch is made to decision operation 456. Otherwise, if no purchase is required or purchase may be delayed until after the request or subscription, processing continues at decision operation 458.

At decision operation 456, the processing module 52 determines if a purchase limitation is exceeded based on a predetermined price limitation. If the purchase limitation is exceeded, then a branch is made to operation 460. Otherwise, processing continues at decision operation 458.

At decision operation 458, the processing module 52 determines if a predetermined storage limitation is exceeded based on a storage requirement of the digital content 140. If the storage limitation is exceeded, then a branch is made to decision operation 464. Otherwise, a branch is made to operation 460.

At operation 460, the processing module 52 registers the digital content 140 for retrieval. At operation 462, the processing module 52 communicates an alert that includes notification information to a predetermined network address based on alert information 210. For example, the processing module 52 may communicate an email to an email address that includes that notifies the recipient of receipt of the digital content 140.

At decision operation 464, the processing module 52 determines if there are more target information entries 123. If there are more target information entries 123, a branch is made to operation 466 where the processing module 52 advances to the next target information entry 123. Otherwise, processing ends.

Figure 18:
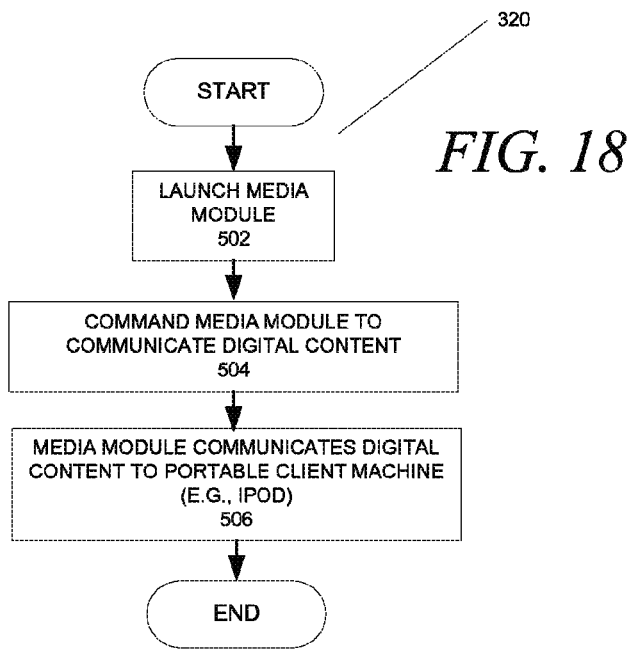

FIG. 18 is a flowchart illustrating a method 320, according to an embodiment, to communicate digital content 140 a portable client machine 32 (e.g., iPod). The method 320 commences at the client machine 22 (e.g., control node) with the distribution module 60 using the media module identifier 262 to launch the appropriate media module 56. For example, the method 500 may commence responsive to receiving the digital content 140 from the server machine 12 (e.g., digital content hub) or responsive to a periodic scheduling. At operation 504, the distribution module 60 may utilize the remote commands 264 and the digital content identifier 260 to command the media module 56 to communicate the digital content 140 that is identified to the portable client machine 32 (e.g., iPod). At operation 506, the media module 56 communicates the digital content 140 to the portable client machine 32 (e.g., iPod) and the method ends.

Figure 19:
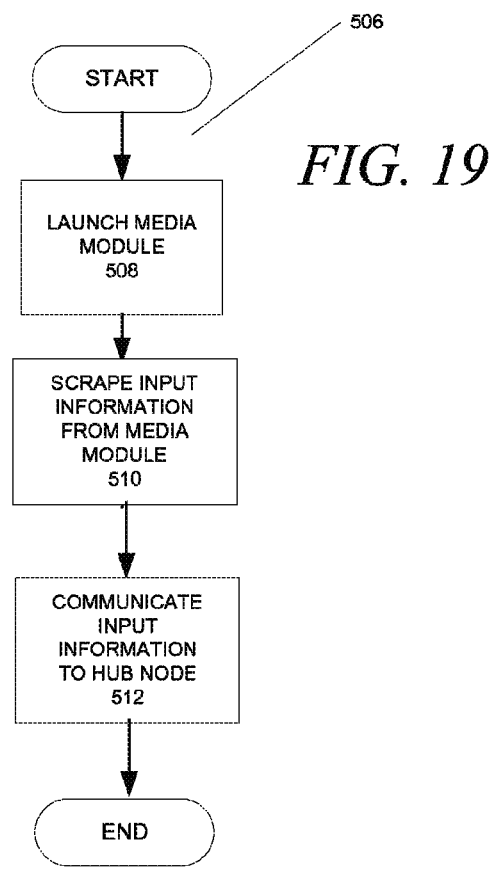
FIG. 19 is a flow chart illustrating a method, according to an embodiment, to receive input information from the portable control node and communicate the input information to the control node.

FIG. 19 is a flowchart illustrating a method 506, according to an embodiment, to receive input information 102 from a portable client machine 32 (e.g., iPod) and communicate the input information 102 to the server machine 12 (e.g., digital content hub). At operation 508, the method 506 commences with the communication module 58 launching the appropriate media module 56. For example, the communication module 58 may launch the media module 56 responsive to detecting a connection of the portable client machine 32 to the client machine 22. Other embodiments may require the user to request input information 102 from the portable client machine 32. At operation 510, the communication module 58 scrapes the input information 102 from the display generated by the media module 56. At operation 512, the communication module 58 communicates the input information 102 to the server machine 12 (e.g., hub node) and the method ends.

Figure 20:
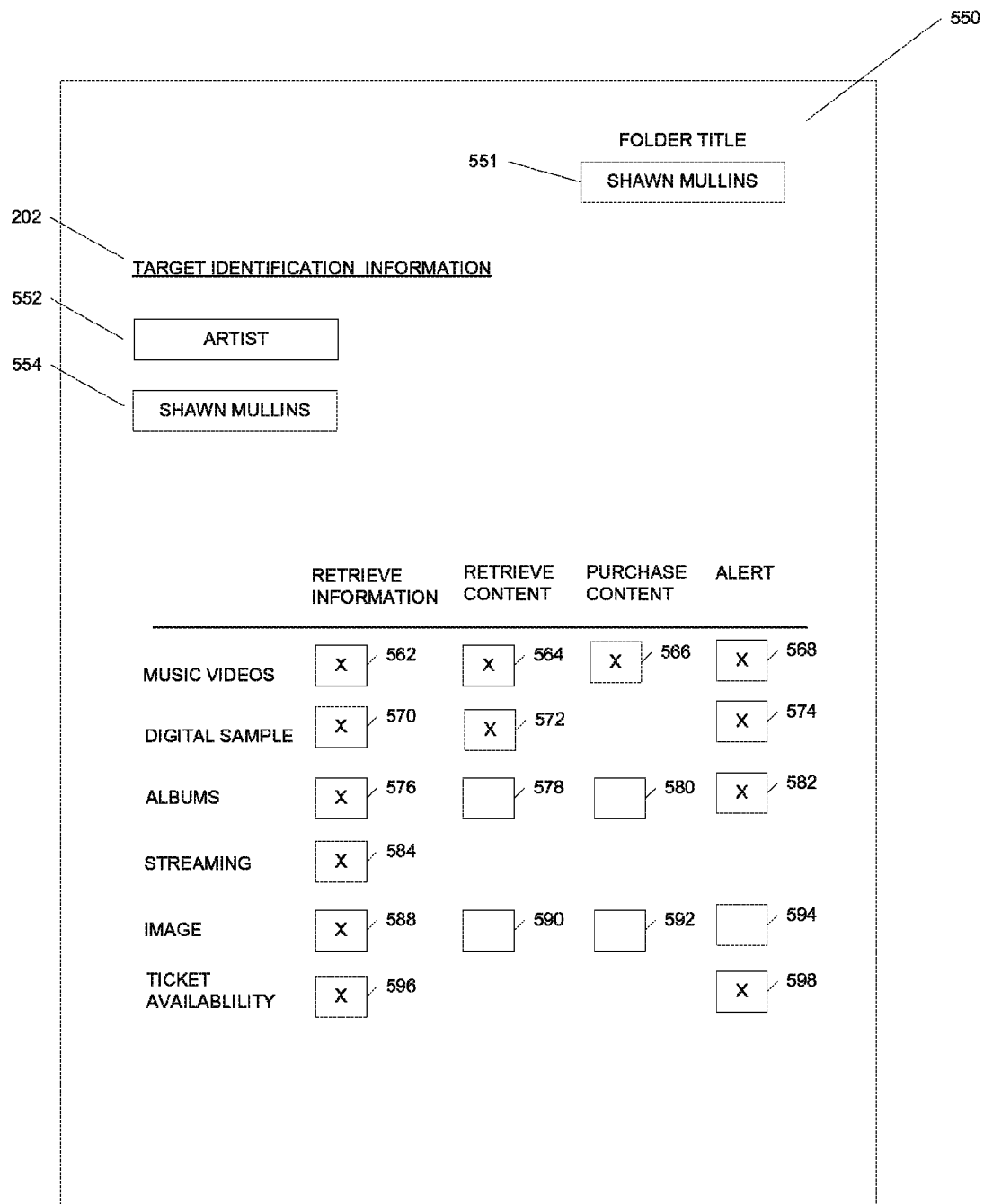

FIG. 20 is a diagram illustrating a user interface 550, according to an embodiment, to receive input information 102. The user interface 550 includes an interface control in the form of an input box 551 to receive a folder title 200 and other interface controls to receive target identification information 202. The folder title 200 may be used to identify a pair of information folders including the input information folder 108 and the output information folder 106.

The interface controls to receive the target identification information 202 include a pull down menu 552, an input box 554, and input checkboxes 562-598. The pull down menu 552 may be used to receive a selection of an artist, creation, or category. The input box 554 may be used to receive the name of an artist, the name of a creation, or the name of a category.

The input checkboxes 562-598 may be used to receive requests for different types (e.g., media types) of digital content 140 (e.g., music videos, sample, albums, streaming, image) and information ticket availability). The input checkboxes 562-568 may be used to receive requests for a music video. The input checkbox 562 may be used to receive a request to retrieve information about music videos for the named artist. Similarly, the input checkbox 564 may be used to receive a request to retrieve digital content 140 and the input checkbox 566 may be used to receive an authorization to purchase (e.g., if necessary for retrieval). Finally, the input checkbox 568 may be used to receive a request to communicate an alert responsive retrieval of a music video.

The input checkboxes 570-574 may be used to receive the same requests for a digital sample. The input checkboxes 576-582 may be used to receive the same requests for an album. The input checkboxes 584 may be used to receive the request for information for digital content 140 that is streamed (e.g., links to initiate streaming). Finally, the input checkbox 596 may be used to receive a request for information about ticket availability.

It will be appreciated that the user interface 500 is merely an example and that target identification information 202 may be received for other types of digital content 140 (e.g., multimedia presentations, slide shows, television episodes, movies, flash video files, etc.).

Figure 21:
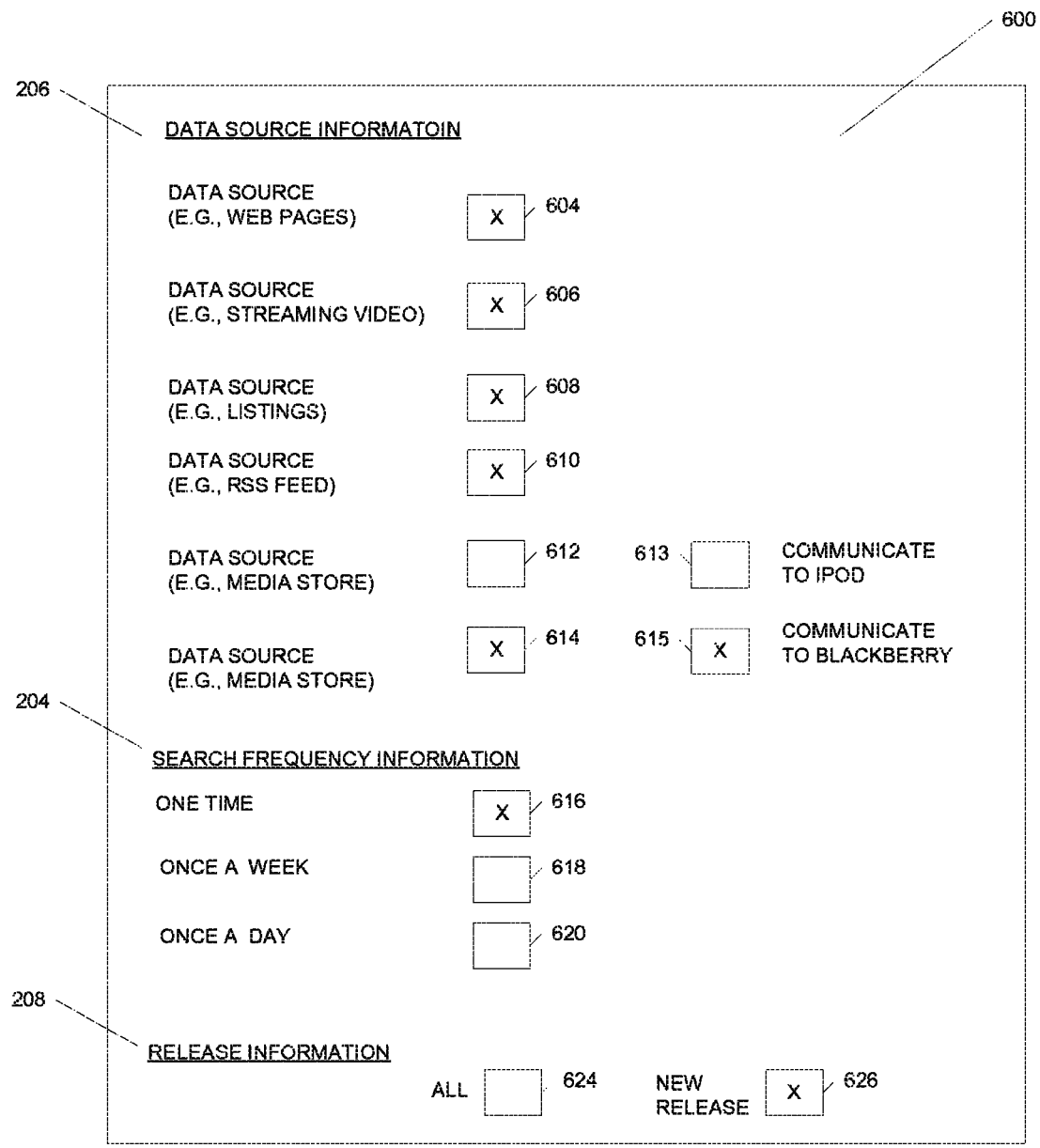

FIG. 21 is a diagram illustrating a user interface 600, according to an embodiment, to receive data source information 206, search frequency information 204 and release information 208. The user interface 600 may be presented to the user responsive to receiving a request to retrieve search result information 145 (e.g., input checkboxes 562, 570, 576, 584, 588, 596) via the user interface 550. The data source information 206 may be received through input checkboxes 604-6145 that respectively identify requests to retrieve search result information 145 and digital content 140 from the identified data sources 18. Associated with the checkbox 612 is a checkbox 613 to request communication of the digital content 140 to the portable client machine(s) 32 (e.g., iPod). The search frequency information 204 may be received via input checkbox 616-620. The search frequency information 204 may be used to schedule searches at a predetermined period. The release information 208 may be received from the input checkbox 624 and 626. The input checkbox 624 may be used to receive a request to retrieve all releases of the digital content. The input checkbox 626 may be used to receive a request to retrieve the latest released digital content.

Figure 22:
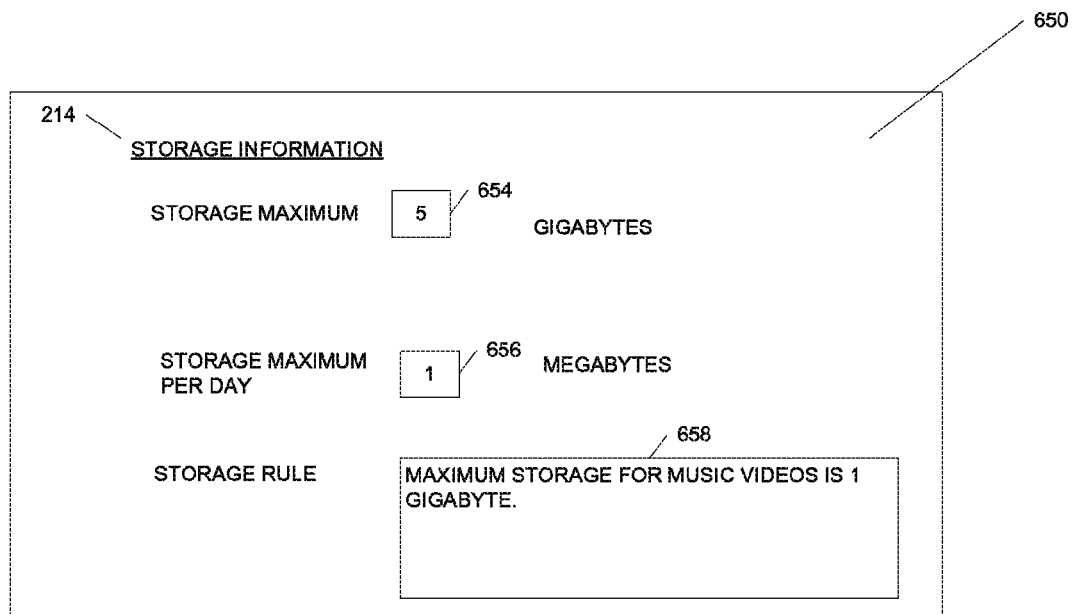

FIG. 22 is a diagram illustrating a user interface 650, according to an embodiment, to receive storage information 214. The user interface 650 may be presented to the user responsive to receiving a request to retrieve digital content 140 of a specified type (e.g., input checkboxes 564, 572, 578, 590) via the user interface 550. The input box 654 may be used to receive a storage maximum limitation. The input box 656 may be used to receive a storage maximum per day limitation. The input box 658 may be used to receive a storage rule limitation. The respective storage limitations may be used by the server machine 12 (e.g., digital content hub) to block retrieval of digital content 140 based on the storage requirements of the digital content 140.

Figure 23:
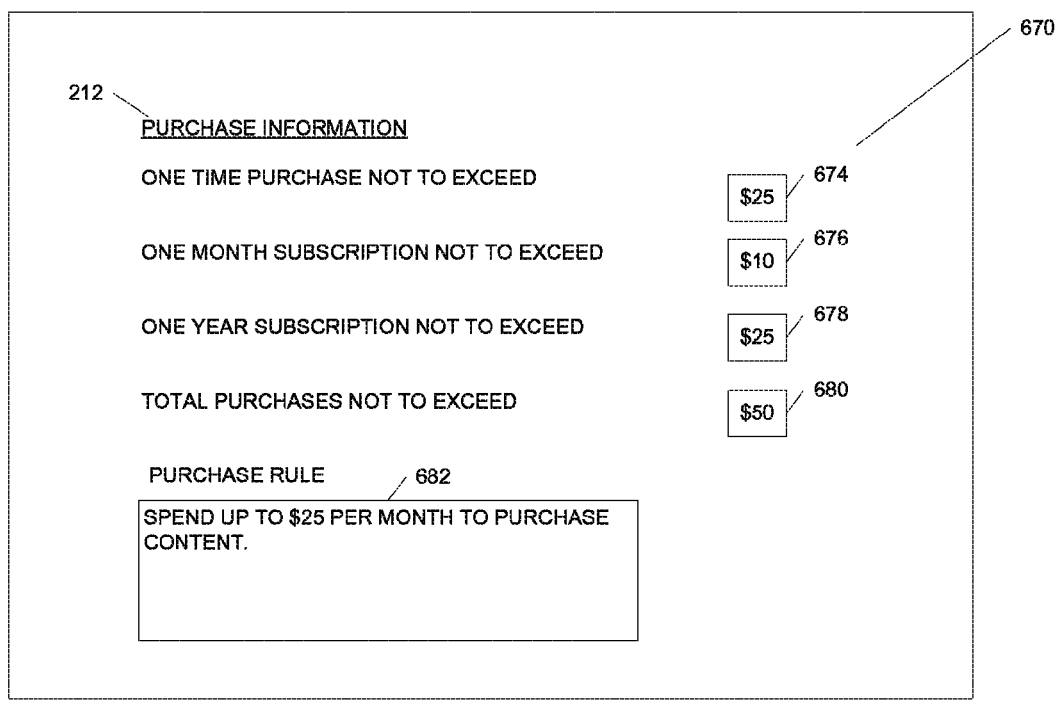

FIG. 23 is a diagram illustrating a user interface 670, according to an embodiment, to receive purchase information 212. The user interface 670 may be presented to the user responsive to receiving a request to purchase digital content 140 of a specified type (e.g., input checkboxes 566, 580, 592) via the user interface 550. The input box 674 may be used to receive a one time purchase not to exceed limitation. The input box 674 may be used to receive a one time purchase not to exceed limitation. The input box 676 may be used to receive a one month subscription not to exceed limitation. The input box 678 may be used to receive a year subscription not to exceed limitation. The input box 680 may be used to receive a total purchases purchase not to exceed limitation. The input box 682 may be used to receive a purchase rule limitation. The respective purchase limitations may be used by the server machine 12 (e.g., digital content hub) to block retrieval of digital content 140 based on the purchase requirements of the digital content 140.

Figure 24:
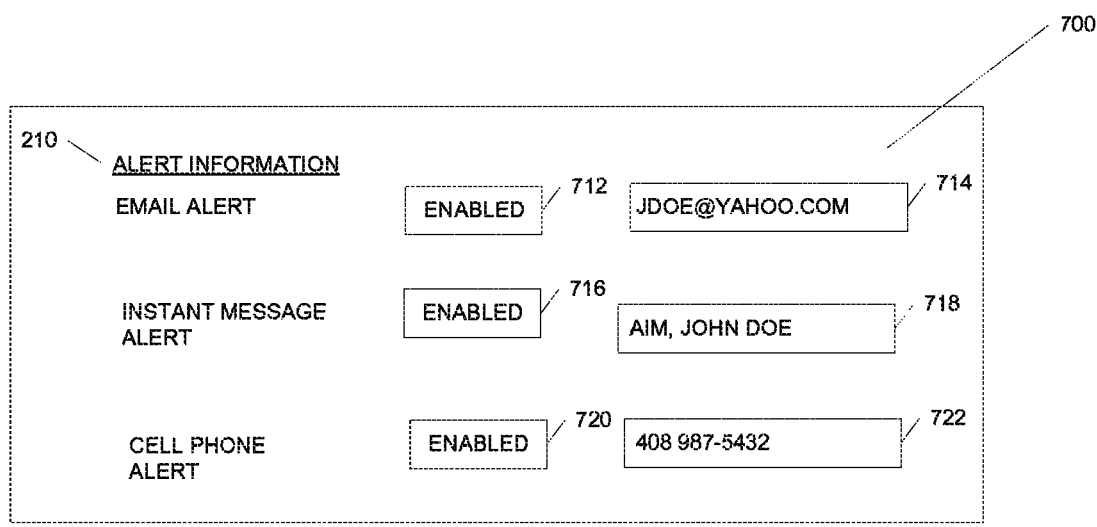

FIG. 24 is the diagram illustrating a user interface 700, according to an embodiment, to receive alert information 210. The user interface 700 may be presented to the user responsive to receiving a request to communicate an alert (e.g., input checkboxes 568, 574, 582, 594, 598) via the user interface 550. The alert information 210 may be received with pull down menus 712, 716, and 720 respectively receiving an operation status (e.g., enabled/disabled) for the respective communication channels (e.g., email, instant messaging, cell phone). It will be appreciated that the alert information 210 may be received for any communication channel capable of communicating a message (e.g., voice mail, VOIP, etc.). The alert information 210 may further be received from input boxes 714, 718, and 722 respectively receiving network addresses for the respective communication channels.

FIG. 25 is a diagram illustrating a user interface 750, according to an embodiment, to receive recommendation information 162, global purchase information 164 and global storage information 166. The recommendation information 162 may be received from input checkbox 752 and input boxes 754, 756. The input checkbox 752 may receive an operation status (e.g., enabled/disabled). Receiving an enabled operation status triggers the recommendation engine 54 to parse the search result information 145 and make recommendations, as previously described. The input boxes 754, 756 may receive a predetermined criterion that is used to determine whether digital content 140 is retrieved based on a recommendation. For example, the input box 754 is illustrated as receiving a predetermined criterion of three. Accordingly, in one embodiment, a search result information entry 121 associated with a recommendation of three stars or greater triggers retrieval of the corresponding digital content 140. Similarly, the input box 756 receives a predetermined criterion to determine whether a recommendation to retrieve digital that requires a purchase may be retrieved based on the recommendation. Accordingly, in one embodiment, a search result information entry 121 associated with a recommendation of four stars or greater triggers payment and retrieval of the corresponding digital content 140.

The global purchase information 164 may be received via input boxes 758-764 that respectively receive predetermined criteria or purchasing limitations, as previously described but, in the present instance, as applied to all purchases and not to purchases of a type of digital content 140. The global purchase information 164 further includes input boxes 766-772 for receiving payment method information that may be used to purchase the digital content 140 via a payment system (e.g., PayPal, etc).

Figure 26:
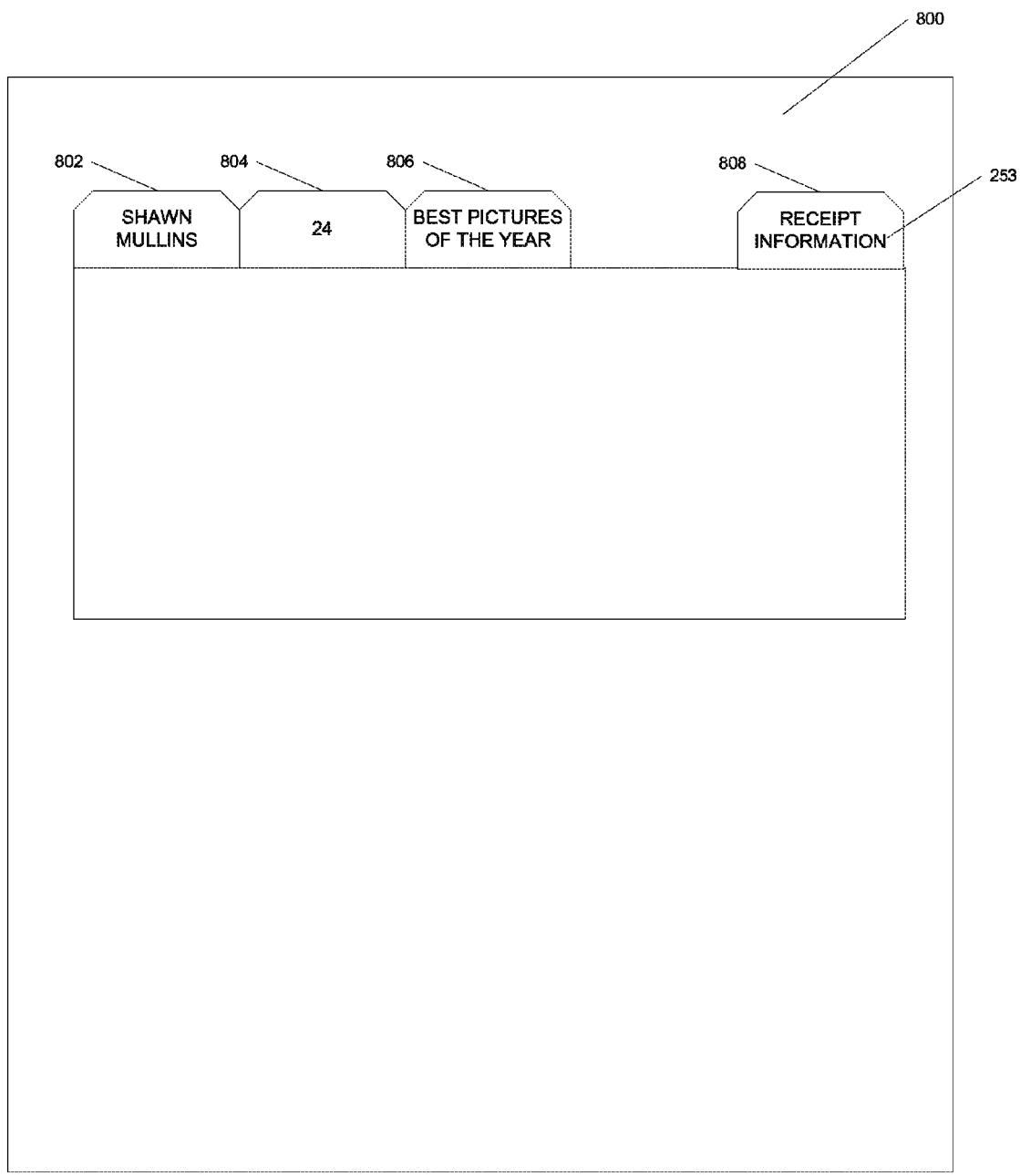

FIG. 26 is a diagram illustrating a user interface 800, according to an embodiment, to display folder information. The folder information may include information contained in the input information folder 108, output information folder 106, and receipt information 810. Illustrated from right to left are tabs 802-808. The tab 802 may be selected to view the information contained in the input information folder 108 and information contained in the output information folder 106 associated with an artist (e.g., "Shawn Mullins"). Similarly, the tab 804 may be selected to view the folder information for a creation (e.g., television series "24") and the tab 806 may be selected to view the folder information for the category (e.g., "Best Pictures of the Year"). Finally, the tab 808 may be selected to view folder information including receipt information 810 for purchase of the digital content 140.

Figure 27:
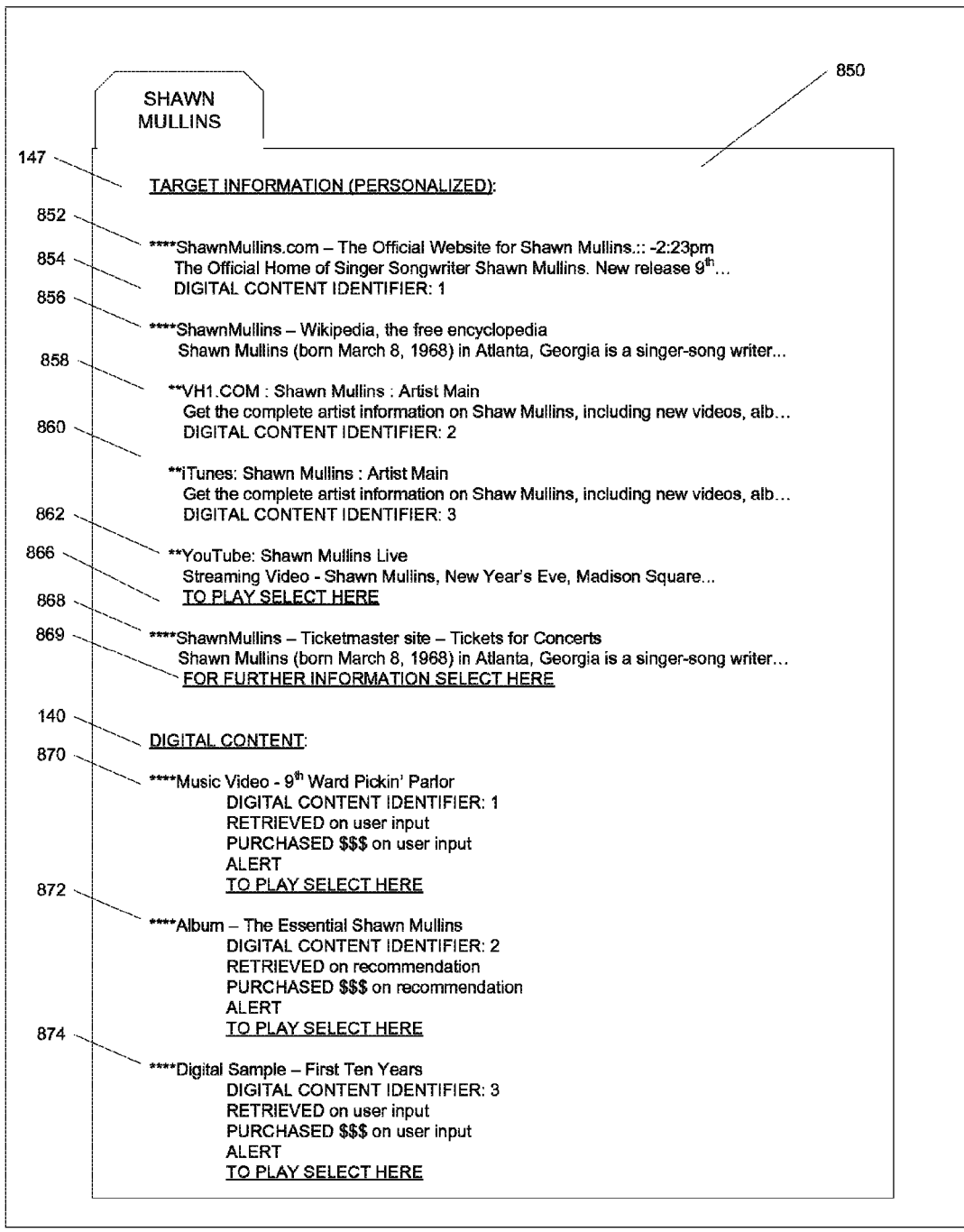

FIG. 27 is a diagram illustrating a user interface 850, according to an embodiment, to present information contained in an output information folder 106. The output information folder 106 includes text blocks 852, 856, 858, 860, 862, 864, and 868 for describing target information 147 for the artist, Shawn Mullins and digital content 140 that has been retrieved from the data sources 18 for the same artist. The text blocks may include a recommendation (e.g. **). The text blocks 852, 856, 858, 860 describe digital content link information 268, according to an embodiment. The text block 862 describes digital content streaming link information 274, according to an embodiment. The text block 862 includes a user interface element 866 that may be selected to initiate streaming. The text block 868 includes information that has been identified via requested information 272 (e.g., ticket availability information), according to an embodiment. A user interface element 869** may be selected for further information about ticket availability.

The user interface 850 further includes text blocks 870, 872, and 874 describing digital content 140 that was retrieved, according to an embodiment.

FIG. 28 is a diagram illustrating a user interface 900, according to an embodiment, to present receipt information 810. The receipt information 810 includes a folder title column 902, associated with a set of payments for digital content 140, and method of payment information 906. Appearing under the folder title column 902 are the folder titles 200, as previously described. Illustrated are three payments for digital content 140 to respective data sources 18 (e.g., awarstore.com, iTunes.com) aggregated into single transaction 904. For example, the server machine 12 (digital content hub) may communicate with the payment system 20 (e.g., PayPal) and the server machines 36 (e.g., data sources 18) to conclude a single charge on the users financial instrument (e.g., VISA, ATM, EFT, etc.) that balances a first payment to a server machine 36 (e.g., awarestore.com) and a second payment to a different server machine 36 (e.g., iTunes.com). Accordingly, the digital content hub provides the advantage of simplifying payment for digital content 140 by automatically aggregating multiple payments to financially independent data sources 18 and a single charge to a financial instrument into a single transaction.

It will be appreciated that other embodiments may receive the above described input information 102 utilizing an interface other than a user interface. For example, the input information 102 may be received via an audio interface, a machine interface, a kinetic interface (e.g., Wii), a graphical user interface or any other type of interface that may receive the input information 102.

Figure 29:
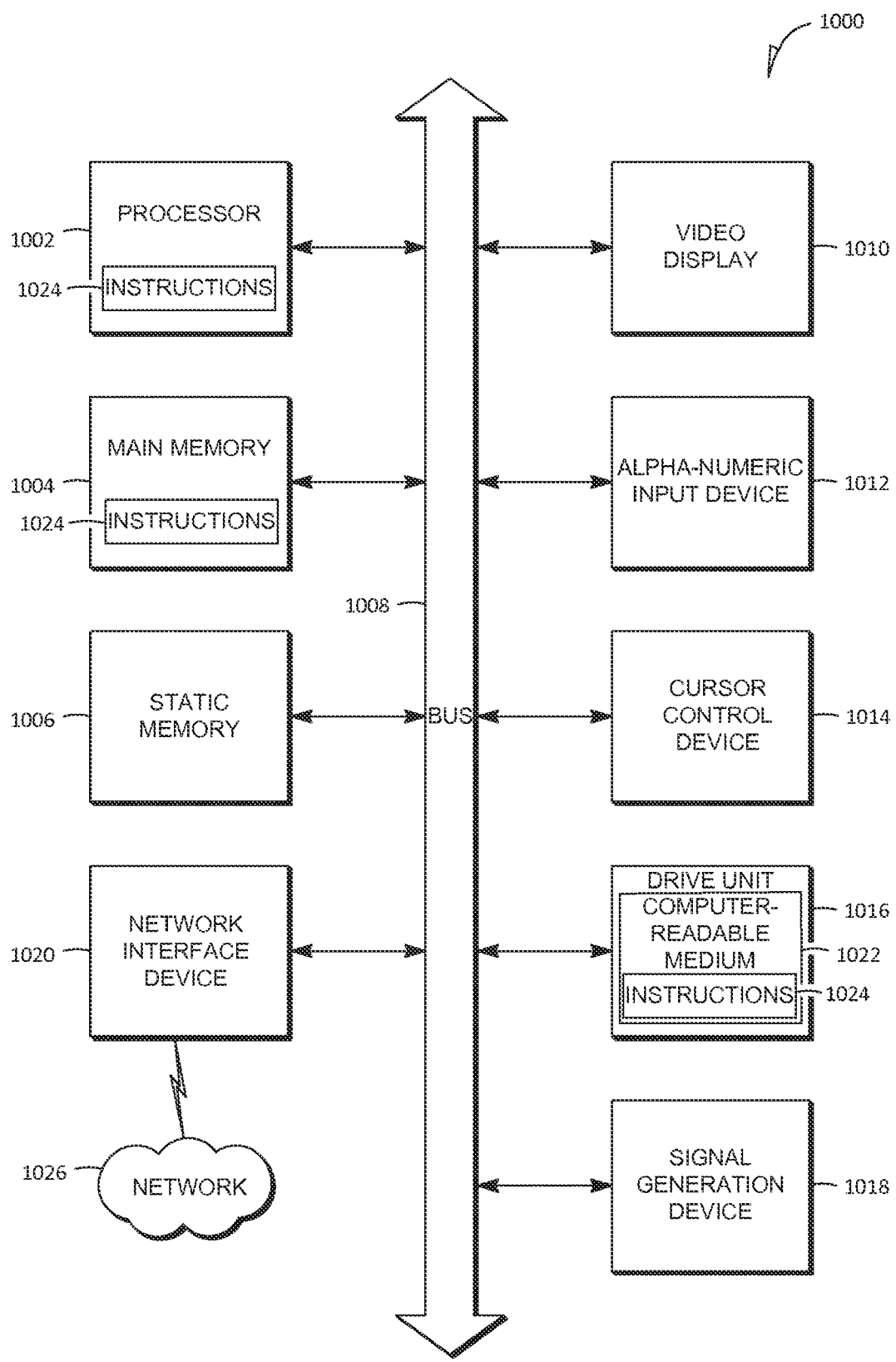
FIG. 29 is a block diagram of a machine, according to an example embodiment, including instructions to perform any one or more of the methodologies described herein.

FIG. 29 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure. The term "machine-readable medium" shall accordingly be taken to include, but not be limited to, solid-state memories, and optical and magnetic media.

Modules, Components and Logic

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Thus, methods and systems to retrieve search result information and digital content have been described. Although the present disclosure has been described with reference to specific, example embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §172(b), requiring an abstract that will allow the reader to quickly ascertain the nature of the technical disclosure. It is submitted with the understanding that it will not be used to interpret of limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on own as a separate embodiment.

What is claimed is:

1. A method comprising:
receiving input information from a client machine, the input information being received via a single user interface and identifying a plurality of data sources from which to retrieve digital content, the plurality of data sources comprising a first data source including a first content provider and a second data source including a second content provider, the received input information further including a purchase limitation that is utilized to prevent a purchase amount from exceeding a predetermined amount;
responsive to the receiving of the input information, retrieving search result information, over a network, from the plurality of data sources based on metadata generated from the input information, the plurality of data sources including a plurality of search engines, the retrieving of the search result information including filtering the search result information based on a media type including at least one of a music video, a digital sample, or a streaming video;
responsive to the retrieving of the search result information, retrieving the digital content, over the network, from at least one of the plurality of data sources based on the search result information and the metadata, the retrieving of the digital content including determining whether the purchase amount exceeds the predetermined amount; and
responsive to retrieving the digital content, communicating the digital content to the client machine.

2. The method of claim 1, further comprising communicating the digital content from the client machine to a portable client machine.

3. The method of claim 1, wherein the receiving of the input information includes at least one of receiving artist information, receiving creation information, and receiving category information.

4. The method of claim 3, wherein the receiving of the artist information includes at least one of receiving a request for a type of artist, receiving a request for an artist, receiving a request for ticket information, or receiving a request for digital sample information, wherein the receiving of the creation information includes at least one of receiving a request for digital content that is released and receiving a request for a multimedia presentation.

5. The method of claim 1, wherein the retrieving of the search result information includes at least one of communicating a query to at least one data source to receive the search result information and communicating a subscription to at least one data source to receive the search result information.

6. The method of claim 1, wherein the retrieving of the search result information is performed periodically based on a predetermined period.

7. The method of claim 1, further comprising determining whether payment is required after the digital content is retrieved from the data source.

8. The method of claim 1, wherein the retrieving the digital content includes at least one of communicating a query to at least one data source to receive the digital content and communicating a subscription to at least one data source to receive the digital content.

9. The method of the claim 1, wherein the retrieving of the digital content includes communicating a subscription to at least one data source and receiving the digital content that is pushed from the data source based on a recommendation of the data source.

10. The method of claim 1, wherein the retrieving of the digital content includes identifying whether payment is required to retrieve the digital content from the data source.

11. The method of claim 1, wherein the retrieving of the digital content includes purchasing the digital content.

12. The method of claim 1, further comprising communicating, on a predetermined communication channel, an alert that the digital content has been retrieved.

13. The method of claim 1, further comprising generating a recommendation for each search result information entry based on profile information, the generating the recommendation being responsive to the retrieval of the search result information, wherein the metadata includes the profile information, the profile information including a history of input information collected from a user over a predetermined period of time.

14. The method of claim 2, wherein the retrieving of the digital content includes generating remote commands associated with the digital content, the remote commands included in the metadata, the remote commands including commands to communicate the digital content to the portable client machine.

15. The method of claim 1, wherein the plurality of search engines includes a first search engine that corresponds to the first data source and a second search engine that corresponds to the second data source.

16. A system comprising:
a processor;
a memory coupled to the processor to store instructions that are configured:
to receive input information from a client machine, the input information received via a single user interface, the received input information identifies a plurality of data sources from which to retrieve digital content, the plurality of data sources comprising a first data source that includes a first content provider and a second data source that includes a second content provider, the received input information further includes a purchase limitation that is utilize o prevent a purchase amount from exceeding a predetermined amount;
responsive to receipt of the input information, the instructions are configured to retrieve search result information, over a network, from a plurality of data sources based on metadata generated from the received input information, the plurality of data sources include a plurality of search engines, the retrieval of the search result information includes a fitter of the search result information based on a media type that includes at least one of a music video, a digital sample, or a streaming video; and
responsive to retrieval of the search result information, the instructions arc configured to retrieve the digital content, over the network, from at least one of the plurality of data sources based on the search result information and the metadata, the retrieval of the digital content includes a determination whether the purchase amount exceeds the predetermined amount; and
responsive to the retrieval of the digital content, the instructions are configured to communicate the digital content to the client machine.

17. The system of claim 16, further comprising a distribution module, at the client machine, to communicate the digital content to a portable client machine.

18. The system of claim 16, wherein the input information includes at least one of artist information, creation information, and category information.

19. The system of claim 18, wherein the artist information includes at least one of a request for a type of artist, a request for an artist, a request for ticket information, and a request for digital sample information, wherein the creation information is includes at least one of a request for digital content that is released and a request for a multimedia presentation.

20. The system of claim 16, wherein the instructions are configured to communicate a query to at least one data source to receive the search result information and wherein the instructions are configured to communicate a subscription to at least one data source to receive the search result information.

21. The system of claim 16, wherein the instructions are configured to retrieve search result information periodically based on a predetermined period.

22. The system of claim 16, wherein the instructions are configured to determine whether payment is required after the digital content is retrieved from the data source.

23. The system of claim 16, wherein the instructions are configured to communicate a query to at least one data source to receive the digital content and wherein the instructions are configured to communicate a subscription to at least one data source to receive the digital content.

24. The system of the claim 16, wherein the instructions are configured to communicate a subscription to at least one data source and wherein the instructions are configured to receive the digital content that is pushed from the data source based on a recommendation of the data source.

25. The system of claim 16, wherein the instructions are configured to determine whether payment is required to retrieve the digital content from the data source.

26. The system of claim 16, wherein the instructions are configured to purchase the digital content.

27. The system of claim 16, wherein the instructions are configured to communicate, on a predetermined communication channel, an alert that the digital content has been retrieved.

28. A system comprising:
a means for receiving input information from a client machine, the input information received via a single user interface, the received input information includes an identification of a plurality of data sources from which to retrieve digital content, the plurality of data sources comprises a first data source that includes a first content provider and a second data source that includes a second content provider, the received input information further including a purchase limitation that is utilized to prevent a purchase amount from exceeding a predetermined amount, and, responsive to receipt of the input information, to retrieve search result information, over the network, from a plurality of data sources based on metadata generated from the input information, the plurality of data sources includes a plurality of search engines, the retrieving of the search result information including filtering the search result information based on a media type including at least one of a music video, a digital sample, or a streaming video; and a means, responsive to retrieving of the search result information, for retrieving the digital content, over the network, from at least one of the plurality of data sources based on the search result information and the metadata, the retrieving of the digital content including determining whether the purchase amount exceeds the predetermined amount, and, responsive to retrieving of the digital content, communicating the digital content to the client machine.

29. A non-transitory machine-readable medium storing instructions that, when executed by a machine, cause the machine to:

receive input information from a client machine, the input information received via a single user interface, the received input information includes an identification of a plurality of data sources from which to retrieve digital content, the plurality of data sources comprises a first data source that includes a first content provider and a second data source that includes a second content provider, the received input information further including a purchase limitation that is utilized to prevent a purchase amount from exceeding a predetermined amount;

responsive to receipt of the input information, retrieve search result information, over a network, from a plurality of data sources based on metadata generated from the received input information, the plurality of data sources includes a plurality of search engines, the retrieval of the search result information includes a filtering of the search result information based on a media type that includes at least one of a music video, a digital sample, or a streaming video;

responsive to retrieval of the search result information, retrieve the digital content, over the network, from at least one of the plurality of data sources based on the search result information and the metadata, the retrieval of the digital content includes a determination whether the purchase amount exceeds the predetermined amount; and responsive to retrieval of the digital content, communicate the digital content to the client machine.

* * * * *

UNITED STATES PATENT AND TRADEMARK OFFICE
CERTIFICATE OF CORRECTION

PATENT NO. : 8,595,203 B2  
APPLICATION NO. : 13/552935  
DATED : November 26, 2013  
INVENTOR(S) : Jay Monahan Page 1 of 1

It is certified that error appears in the above-identified patent and that said Letters Patent is hereby corrected as shown below:

In the Claims:

In column 19, line 63, in Claim 16, delete "utilize o" and insert --utilized to--, therefor In column 20, line 4, in Claim 16, delete "fitter" and insert --filter--, therefor In column 20, line 9, in Claim 16, delete "arc" and insert --are--, therefor In column 20, line 37, in Claim 21, after "retrieve", insert --the--, therefor Signed and Sealed this  
Twenty-seventh Day of May, 2014

Michelle K. Lee  
*Deputy Director of the United States Patent and Trademark Office*